United States Patent [19]

Kramer

[11] Patent Number: 4,529,228
[45] Date of Patent: Jul. 16, 1985

[54] METHOD AND APPARATUS FOR CODING PICTORIAL INFORMATION FOR EFFICIENT STORAGE, TRANSMISSION AND REPRODUCTION

[76] Inventor: Henry P. Kramer, 1503 Mission Canyon, Santa Barbara, Calif. 93105

[21] Appl. No.: 463,227

[22] Filed: Feb. 2, 1983

Related U.S. Application Data

[62] Division of Ser. No. 183,372, Sep. 2, 1980, abandoned.

[51] Int. Cl.³ .................. B42D 15/00; G06R 9/50; G06K 9/08
[52] U.S. Cl. ................................ 283/1 R; D18/26; D21/108; 101/399
[58] Field of Search ............... 283/1 R; D21/108; D18/26; 101/372, 398, 399; 340/756, 757, 758, 759, 760

[56] References Cited

U.S. PATENT DOCUMENTS

| D. 241,776 | 10/1976 | Bibl et al. | D18/26 X |
| 2,202,592 | 5/1940 | Maxson | D21/108 X |
| 3,444,319 | 5/1969 | Artzt et al. | D18/26 X |
| 3,810,095 | 5/1974 | Bibl | D18/26 X |
| 4,281,312 | 7/1981 | Knudson | 340/146.3 MA |

FOREIGN PATENT DOCUMENTS 883291 6/1943 France ........................ 101/399

Primary Examiner—Paul A. Bell
Attorney, Agent, or Firm—Alan H. MacPherson; Richard Franklin; Steven F. Caserza

[57] ABSTRACT

A character in a set of characters comprising a font for use in reproducing an image comprises a composite of two colors wherein at least one of said two colors occupies one area of said character and the other of said two colors occupies at least two areas of said character, said at least two areas of said other color being separated from each other by said one area of said one color.

9 Claims, 21 Drawing Figures

GENERAL LAYOUT OF THE INVENTION

CONFIGURATION FOR DIGITIZING IMAGES AND CODING THEM FOR PRINTING ON XEROX 9700.

A SET OF 200 PATS, CON'T.

A SET OF 200 PATS

EXAMPLE OF KRONTEK GRAPHICS
FOR
XEROX 9700 OR BURROUGHS 9270

PAT MADE UP OF DOTS

PAT MADE UP
OF STROKES

A MINUTE PORTION OF
A BLACK & WHITE IMAGE

THE IMAGE OF FIG. 7
REPRESENTED AS
ZEROES AND ONE.

| BYTE 1 | BYTE 2 | BYTE 3 | BYTE 4 | BYTE 5 |
|---|---|---|---|---|
| 00001111 | 11000011 | 11000111 | 11111100 | 01111111 |

| BYTE 6 | BYTE 7 | BYTE 8 | BYTE 9 | BYTE 10 |
|---|---|---|---|---|
| 00111111 | 10000111 | 11000111 | 11000011 | 11110000 |

| BYTE 11 | BYTE 12 | BYTE 13 |
|---|---|---|
| 11111000 | 00111100 | 00000000 |

FIG. 9

THE BINARY IMAGE OF FIGURE 8 STORED IN A SEQUENCE OF BYTES

FIG. 11

AN ILLUSTRATION OF A HYPOTHETICAL BUFFER OF 16 ROWS AND 48 COLUMNS DIVIDED FOR PROCESSING INTO 3 16×16 ELEMENTARY IMAGE ARRAYS.

ILLUSTRATION OF PROCESSING PROCEDURE

OVERALL FLOW OF METHOD

STAGE 1

STAGE 2

STAGE 3

ONE SUPER SRA CONSTRUCTED FROM FOUR SMALLER ADJACENT SARS

95% white
7,729 bytes
371,250 bytes in
   original
48:1 compression

89% white
9,995 bytes
236,250 bytes in original
23.6:1 compression

METHOD AND APPARATUS FOR CODING PICTORIAL INFORMATION FOR EFFICIENT STORAGE, TRANSMISSION AND REPRODUCTION

This application is a division of application Ser. No. 183,372, filed Sept 9, 1980.

BACKGROUND OF THE INVENTION

1. Field of the Invention

This invention relates to the transmission of images, and in particular to an efficient method for coding images, transmitting signals representative of the codes representing the images to a receiver and to the set of characters making up a font used to replicate an image, and to the efficient selection of an optimum font for this purpose.

2. Prior Art

An important way of communicating information of a business or technical nature is by use of line art such as drawings, schematics, diagrams, signatures, logos and various conventional symbols such as the letters, numerals and punctuation marks of ordinary written or printed communications or such special symbols as are employed in a particular trade or profession. Line art is generally produced by the drawing of a pen, pencil, or brush on paper. The consequence of this is twofold. In the first place, line drawings consist of marks in one color on background in another color; for example, black on white. Secondly, the marks produced in line art are generally narrow and long. That means that each component of a line drawing, considered as a region in a two-dimensional space, has generally two distinct measurements in perpendicular directions which can be denoted as the lengths and the widths of a stroke, with width being much smaller than length.

The development of technology for transforming optical signals representing images into electronic form, processing these electronic signals by means of highly efficient digital logic methods, and reproducing or displaying the images in human accessible form, has made feasible the cost-effective storage, transmission, and subsequent reproduction or display of images, including in particular, line art as discussed above. This technology promises the automatic storage and retrieval of letters, and other documents considered as line art (such as checks, bills of lading, credit cards, slips, etc.), the transmitting of such letters and other information in the form of electronic signals, and the bypassing of slower and possibly more expensive mail. The subsequent presentation of the information to the human addressee can be transitory using, for example, a cathode ray tube display, or permanent, by forming a replica on paper.

One factor that inhibits the rapid evolution and acceptance of electronic image processing is the large quantity of information that is contained in a digitized image and the resulting high cost of storage and transmission and slowness of printing. The following numbers will clarify this remark. In order to achieve printing of acceptable office quality, a density of about 300 dots per inch is necessary. For high quality printing perhaps twice this density is required. Therefore, to represent with adequate quality the image content of an 8.5" by 11" page by means of black and white dots, a total of about 8.5 million black and white dots must be stored. This is such a large number that even in the memory of large computers at most a few pages can be stored. Small computers, whose selection is dictated by cost considerations, can hold only a fraction of a page. In transmission and reproduction of images, the large number of dots required to represent an image results either in the use of extremely expensive but fast apparatus, or else in correspondingly slow transmission and reproduction rates. The result in either case is that the production cost per unit time is high.

The method of overcoming this high cost of production per unit time is to transform the image into a smaller number of black and white dots, or more generally, units of information termed "bits" in the literature. For one-dimensional signals there is a rich literature beginning with the work of Claude Shannon on effective methods of transforming signals for efficient transmission. Transformations of this nature which are reversible (i.e., capable of perfectly reproducing the original image from the code), are called codes or coding schemes. A good summary of this work is found in Robert J. McEliece's book *The Theory of Information and Coding: A Mathematical Framework for Communication,* Redding, Mass. Addison-Wesley 1977. Much less work has been done in the area of two-dimensional encoding (See the article by Frank entitled "High Fidelity Encoding of Two-Level, High Resolution Images," Proceedings 1973 International Conference on Communications, IEEE, June 1973). Past work on encoding has emphasized as essential the faithful reproduction of the original information. The problems of efficient image encoding, however, underscore the essential subjective nature of reproduction of images.

The number of bits required to represent a given area of an image has been defined as $N^2$ bits per square inch (where N represents the number of bits per linear inch) by Knudson in a paper entitled "Digital Encoding of Newspaper Graphics" dated August, 1975, and issued by the Massachusetts Institute of Technology Electronic Systems Laboratory, Cambridge, Mass., Report No. ESL-R-616. Knudson, in this paper, describes work toward reducing or minimizing the number of information bits required to represent the image, and at the same time yield printed copy that closely approximates the high quality of the original. To do this, Knudsen recognizes that meaningful images are not completely random collections of elements, but that the inherent structure of images can often be utilized to define a set of characters for use in reproducing the image which reduces storage requirements.

As explained by Knudson, a common data compression technique is called "run-length coding." This technique comprises the compression of image data by applying codes to the run-lengths of identical elements of the image rather than to each individual element itself. The data compression achieved depends upon pictorial content, but compression ratios for one-dimensional run-length codes commonly range from two to four for typical images.

Knudson discloses a second technique for reducing the amount of data to be transmitted during image transfer called "two-dimensional run-length codes". This technique codes only the differences between run-lengths from one line to the next, rather than the run-lengths themselves. Since adjacent scan lines tend to contain similar bit patterns, the differences between run-lengths tend to be smaller numbers than the actual run-lengths, and fewer bits are needed to code them. An average data compression ratio of approximately fourteen to one has allegedly been obtained for the transmission of complete newspaper pages, including text and advertising artwork.

Knudson discloses another technique for reducing the data transmission rate required to transmit a given image. Knudson discloses the individual encoding of small square segments of the image by partitioning the image into small blocks or "subpictures." A block pattern is then selected from a predetermined set of patterns for each subpicture of the image so as to approximate closely the image within that block. According to Knudson, his technique permits finer image detail than the prior art techniques (which included a half-tone technique using dots of different diameters to represent the average gray level over a subpicture area) because the patterns used to represent the various blocks have a greater variety of shapes compared to the prior art uniformly shaped half-tone dots. Knudson discloses the use of 62 patterns (see FIG. 1a) excluding the all white pattern which is never printed. Each pattern is typically produced by an array of appropriately colored dots. Unfortunately, the system of Knudson yielded results of insufficient quality. Data compression was relatively inefficient.

The printing or displaying of images by means of minute elements such as circular (or square) marks or "dots" of one color on a background of another color (as done by Knudson) is well known in the art. The quality of the reproduction depends on the number of dots per unit area. For superior quality, the number of dots per square inch must exceed one million. Excellent quality can be achieved with a density of two hundred fifty thousand (250,000) dots per square inch. Good commercial and office quality is produced at densities between sixty thousand (60,000) and one hundred thousand (100,000) dots per square inch. Computer output printers and displays produce alphanumeric characters and images at densities between about four thousand (4,000) and forty thousand (40,000) dots per square inch. Table 1 below summarizes this information by correlating density of print elements with print quality. The density is expressed in linear dimensions as number of dots per inch. The corresponding two-dimensional density is merely the square of this quantity.

TABLE 1

| Density (dots/inch) | Print Quality |
|---|---|
| Greater than 1,000 | Superior (graphic arts, fine arts) |
| 500 to 1,000 | Excellent (quality magazines) |
| 250 to 500 | Good Commercial and office (Executive correspondence) |
| 60 to 250 | Computer output quality |

A known method of rendering photographs for reproduction in print is known as half-tone screening. In this method, the photograph is divided into a grid of squares and for printing, each square is replaced by one occupied by a "dot" whose size is proportional to the area density. That is, the ratio of the dot area to the area of the square closely approximates the density in the square. In this method of reproduction, the resolution, that is, the number of squares per inch (also called the mesh), is also closely correlated with the quality. Table 2 below shows the correlation between quality of reproduction and mesh. An additional parameter is also introduced. This is the number of distinct gray levels and equals the number of distinct "dot" sizes and shapes.

TABLE 2

| Mesh (No. of squares/inch) | No. of Gray Levels | Quality |
|---|---|---|
| Greater than or equal to 150 | Greater than or equal to 64 | Superior (fine arts, graphic arts) |
| 120–150 | 32 | Excellent (quality magazines) |
| 65–120 | 16 | Good commercial (inplant printing, newspapers) |
| less than 65 | 16 or less | Utility |

The known art of half-tone reproduction has an important feature in common with Knudson's disclosure. In all the instances mentioned, an image is analyzed in elementary parts, squares in the case of half-tone reproduction and in Knudson's teaching, and the actual image in each elementary part is replaced by one or another of a set of predetermined patterns. The important criteria for comparing and judging the quality of image reproduction are the design of the set of patterns, the methods for assigning a specific pattern to a given image element, and the degree of compression achieved in relation to the quality. Knudson states that "62 patterns and approximately 125 subpictures per inch represent a reasonable compromise between image quality and storage requirements. Under these conditions, slightly less than $10^5$ bits are needed to store each square inch of picture, yielding a compression ratio of 10:1 over point-by-point coding at 1,000 elements per inch resolution."

SUMMARY OF THE INVENTION

The present invention is based in part upon the realization that significant efficiencies in data transmission and quality of image reproduction can be achieved by increasing the number of patterns (also called "characters") in the set of patterns used to reproduce an image while decreasing the number of image subpictures relative to the prior art. In one embodiment of this invention a set of 235 distinct patterns is used to reproduce the image, including patterns that have one and two rectilinear boundaries between different colors of each pattern, those that have boundaries between different colors consisting of two line segments joined non-orthogonally as well as orthogonally, and those that are rectangular or of irregular shape instead of square.

If m represents the number of subpictures per inch and n represents the number of patterns or characters in the set, I have found that the number of bits b per square inch is given by $b = (m \ln_2 n)^2$, where $\ln_2 n$ is the logarithm to base 2 of n. Table 3 shows b as a function of m and n for selected values of m and n.

TABLE 3

| m \ n | 50 | 100 | 150 | 200 | 250 |
|---|---|---|---|---|---|
| 25 | 19,881 | 27,556 | 32,671 | 36,481 | 39,701 |
| 37.5 | 44,733 | 62,001 | 73,509 | 82,082 | 89,326 |
| 50 | 79,609 | 110,224 | 130,682 | 145,924 | 158,802 |
| 75 | 178,929 | 248,004 | 294,035 | 328,329 | 357,305 |
| 80 | 203,581 | 282,173 | 334,547 | 373,565 | 406,534 |
| 100 | 318,096 | 440,896 | 522,729 | 583,696 | 635,209 |
| 125 | 497,025 | 688,900 | 816,764 | 912,025 | 992,154 |

Table 3 shows that as the number of picture elements per inch is doubled while keeping the size of the pattern set constant, the number of bits is quadrupled. However, as the number of patterns is doubled, holding the number of picture elements per inch constant, the number of bits increases by a factor of no more than 1.39.

The present invention takes advantage of this mathematical relation by using a relatively large set of patterns (200 in one realization) compared to Knudson with 63 patterns, while using 37.5 picture elements per inch, as compared to Knudson with 125 picture elements to the inch. According to the above formula, the present invention in the cited realization uses 82,082 bits/square inch, while the Knudson parameter values indicate 553,945 bits per square inch. In other words, the present invention achieves a compression improvement by a factor of about 6.75 over the prior art.

Surprisingly, I have found that the actual improvement is considerably better since, in the present invention adjacent all-white and all-black spaces are combined in single color or dual color super patterns. Statistics show that, depending on the artwork, (see FIGS. 24a, 24b and 24c) 85% to 95% of most picture elements are white. By the use of super patterns in accordance with this invention, a large part of the all white space and the all black space can be represented by few patterns. By this means, an additional sizeable compression is achieved in this invention. In one embodiment, thirty-five (35) additional characters representing super-patterns are added.

As the reproduced images in FIGS. 19a and 19b show, the greater data compression of the present invention over prior art is achieved while maintaining excellent image quality.

The method of image encoding in accordance with this invention differs from most previous work in two respects. The transformation is not reversible and the invention recognizes explicitly the subjective nature or quality of reproduction. A transformation is called reversible if it is possible in a unique fashion to reconstitute the input from a knowledge of just the output. If, from a knowledge of the output, it is not possible to determine uniquely what the input was, the transformation rule is not reversible. For example, if a transformation rule calls for replacing every 8×8 image matrix that has fewer than eight white elements by one that is totally black, it is not possible on observing the output, a totally black matrix, to determine whether the input consisted of a matrix with, say, three white elements or eight white elements. The transformation is thus not reversible.

In accordance with this invention, the image is first transduced from optical form to electrical form by means of a suitable apparatus of well-known design. Referring to FIG. 1, the resulting output signal is digitized by a digitizer 102 and is then stored in an electronic storage means 103. The storage may be of the entire image or of sufficient but not necessarily complete portions of it in sequence. As a result of the transduction process and the digitization, the image is represented in storage means 103 as a sequence of zeroes and ones in which typically the zeros represent the occurrence of a point with the background color and the ones represent the occurrence of a dot of the color of the mark. An elementary sequence of zeroes and ones represents a scan line while a sequence of scan lines makes up the entire image. The image is stored in storage 103 in raster-scanable binary form. The transformation logic 104 decomposes the image into subpictures (sometimes called "subregions") and for each subregion determines which particular image pattern from a finite and preselected set of a standard library of image patterns (hereinafter called picture atoms or "PATs") most closely represents the subregion.

The transforming logic 104 produces a sequence 105 of symbols, each of which either represents the identity of a PAT, or assists in locating each PAT in relation to the other PATs. This latter symbol is often called a "metafunction". The sequence of these two kinds of symbols contains the information necessary to form from PATs a two-dimensional display 106 of the original image either on a display device or else on hard copy. This two-dimensional display of the original image is, in accordance with this invention, an excellent reproduction of this image.

This invention makes use of a plurality of PATs, each PAT consisting of uniquely combined array of display or print elements (in a preferred embodiment dots, although other display or print elements such as bars or rectangles, for example, could equivalently be used) from which images can be reproduced in an optimal manner. Each PAT (also called a "character") in the font comprises an array of dots (each array can, in accordance with this invention, vary in number of dots from, for example, 5×5, up to any reasonable number, for example, 16×16). Each character in the font is selected using guidelines as described herein to provide a font which optimally reproduces a transmitted image. The qualitative perception by a viewer of an image is, as I have discovered, greatly dependent upon the characters in the font used to reproduce the image. The font of this invention overcomes many of the disadvantages of prior art fonts by providing a set of characters which allows the efficient transmission of information defining an image to be reconstructed while at the same time enhancing greatly the quality of the reconstructed image over images produced using prior art fonts.

As part of the invention, I provide a unique algorithm to allow the selection in a substantially optimum manner of a particular character in the font to represent a portion of the image being transmitted. My algorithm involves determining not only the character in the font which has a minimum difference in terms of dot count between the dots representing the character and the dots representing a subpicture of the image being transmitted, but in addition, weights the location of the different dots in the image subpicture being transmitted and in the font character so as to select a font character for use in reproducing the image subpicture which most resembles that subpicture. The algorithm for selecting the particular font character to represent a given portion of the image makes use of the X and Y coordinates of the center of gravity of the black portions of the image. These coordinates are calculated by using the number of black dots in each row, and the number of black dots in each column. The algorithm allows the extremely rapid determination of those subpictures of the image being transmitted which are all black or all white, thereby substantially reducing the time required for coding the image into the font characters (i.e., for selecting the particular font characters to be used to represent the image). While this invention will be describing using black and white colors, it should be understood that this invention can be used to transmit images of any color or colors on a background of another color or colors so long as the color (or colors) of the image are capable of being distinguished from the background, and the words "black" and "white" when used in this specification are to be understood to have this broad meaning.

As a feature of this invention, a font character does not necessarily have to be square. This invention makes use of the fact that large portions of images to be transmitted are either all black or all white and these portions are not necessarily square in shape. In accordance with this invention, the ability to aggregate a number of font characters which are either all black or all white into one super font character is provided, thereby greatly reducing the amount of information which must be transmitted to provide a replica of the all black or all white portions of the image. The concept of a super character or super PAT is extended in accordance with my invention to include irregularly shaped aggregates of selected font characters which occur with sufficient frequency in the transfer of images to justify as a matter of transmission economy the designation of such groups as special font characters. Each of these special super characters can be all black or all white, or a mixture of these colors. Such a super character, built up of PATs, can approximate any shape desired, and the character will then be identified by a code number and its location will be identified by an XY coordinate referred to a prearranged fiducial point on the character.

As another feature of this invention, heuristically optimized font characters are provided which, in a departure from the prior art, include more than one boundary between two colors within the character. Thus, the font of this invention includes font characters containing one boundary between one color and another color (i.e., one boundary between black and white, for example), as well as font characters which include two or more boundaries between one color and another color. By boundary is meant a line (straight or otherwise) drawn from one edge of the font character to the same or another edge of the font character. It should be recognized of course that when a character is comprised of dots, a boundary is not, in reality, a straight line, but rather comprises a series of dots of one color adjacent another series of dots of another color. However, the concept of a boundary, when understood with this limitation, can conveniently be represented as a line as is so in this specification.

As a feature of this invention, complex electronic equipment sufficient to encode images to be transmitted from one location to another is required only at the transmitting end of the transmission link. The receiver is required mainly to have sufficient memory capacity to store the various characters making up the font used to replicate the image but does not require the complex logic circuitry necessary to select a particular character to represent a subpicture of the image for transmission. Accordingly, significant savings in equipment are obtained over the equipment required to implement more complex transmission schemes such as that one disclosed, for example, in U.S. Pat. No. 4,103,287 issued July 25, 1978 on an application of Amalie Julianna Frank.

The present invention has important application to electronic printers and type setters. With a fixed speed, dry process laser printer like the Xerox 9700 the method and apparatus of this invention make possible the printing of images which without its use is unachievable. The Xerox 9700 must have deposited in an internal memory with a limitation of 24,000 bytes all of the information required to print a page prior to the initiation of the laser printing process for that page. Each byte must refer either to a metafunction, i.e., a directive to manage the printing, or to a character that is stored in the font memory. The font memory is limited to 1 megabyte. If the image were to be printed by directing the laser to print a sequence of elementary dots (each having an area of $1/(300 \times 300)$ square inches) then a black area of at most $24,000/90,000 = 8/30$ square inches could be printed on a page. This is not enough for most pictures. For this reason, printing has to be done with larger characters. The design of such characters and their use in printing is the essence of this invention.

Phototypesetters, like the Mergenthaler Linotron 202 and the APS5 made by Autologic Corporation, for example, do not generally work at fixed speed. Therefore, they do not require the information for an entire page to be in memory prior to printing. It is possible, therefore, to print images with phototypesetters in a slow way by directing the printing of point after point on the phototypesetters. The time required for printing as well as the storage needed for an image with this type of printer are both markedly reduced by the use of the present invention. Thus, while the invention makes possible the printing of images one page at a time with a laser printer such as the Xerox 9700, it makes the printing of images much more economical in the employment of time and storage when printing with a CRT photostypesetter.

Another embodiment of this invention provides an alternate way of generating art work. Certain fiducial points such as line or curve intersections and terminations are provided by human input or as the result of calculations or measurements that may be provided by automatic equipment. A computer program then supplies a binary image which satisfies all of the same specifications as the original art work digitization.

DESCRIPTION OF THE DRAWINGS

FIG. 9 shows the binary image of FIG. 8 stored in a sequence of bytes;

FIG. 11 illustrates a hypothetical buffer of 16 rows and 48 columns divided for processing into three $16 \times 16$ elementary image arrays.

DETAILED DESCRIPTION

Methods of Digitization

Figure 3A:
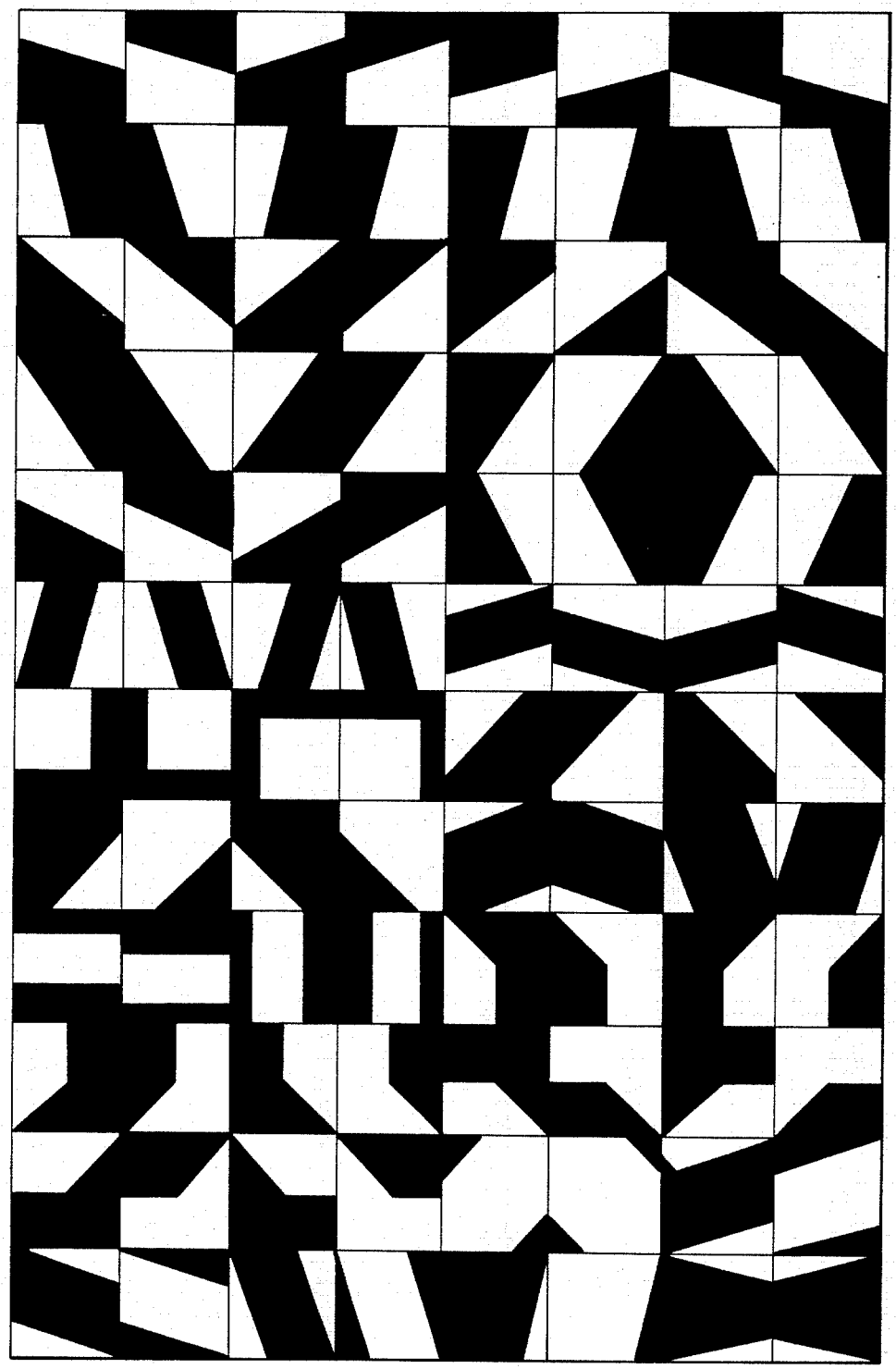
FIGS. 3a and 3b show 200 of the 235 patterns comprising the "picture atoms" constructed in the unique manner in accordance with this invention.
Figure 3B:
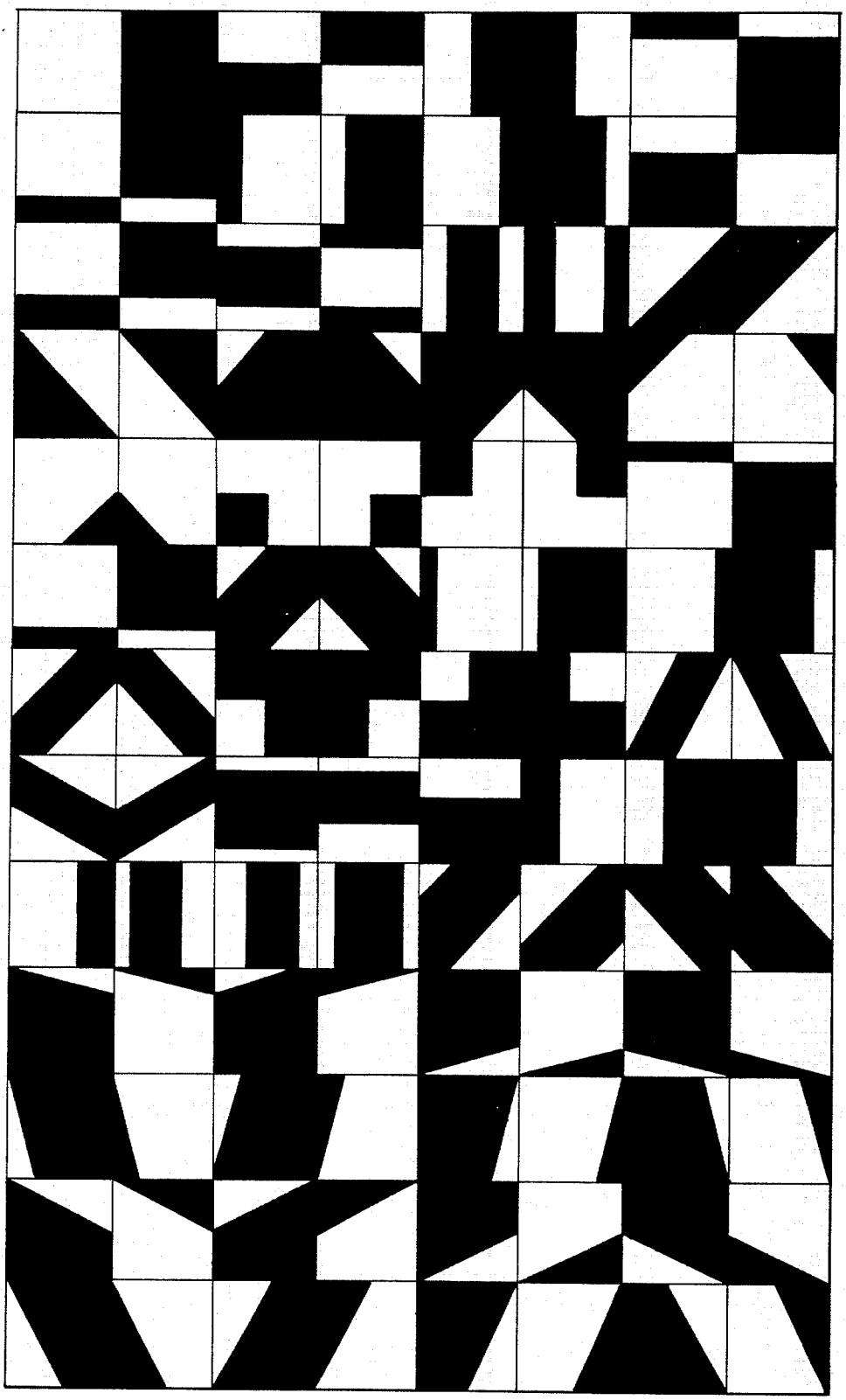

This invention will now be described in conjunction with a particular set of picture atoms ("PAT") as shown in FIGS. 3a and 3b. The principles of this invention can be applied to the generation of other sets of picture elements (those sets are known in the printing art as "fonts") with the understanding that each PAT is composed of a selected number of dots typically 8×8, but capable of assuming any appropriate number.

Two general categories of techniques, "passive" and "active", are available to produce a raster-scan binary image. The passive technique gathers reflected or transmitted light during a brief exposure period from a well localized region on the opaque or transparent object being imaged. The active technique uses a beam of light produced by a laser or a cathode ray tube and deflected over the object either by mirrors or electronic control. In the active method, the light produced by the entire object is simultaneously gathered. Spatial information corresponds to the known position of the light beam during the period of exposure. The light that is gathered during a specific interval of time is ascribed to the portion of the image that is illuminated by the beam during that time interval. Since the motion of the beam is controlled in time, its position is precisely known as a function of the time and therefore so is the location of the illuminated picture element.

Passive electro-optical transducers suitable for use with this invention to generate an image for transmission include self-scanning diode arrays such as those provided by Reticon, Inc., and Fairchild Camera and Instrument Corporation, charge injection device arrays (CID) such as those produced by General Electric Corporation, charge coupled device arrays (CCD) such as those made by Fairchild Camera and Instrument Corporation and vidicon, plumbicon, SIT and image dissector television tubes made by a number of firms such as General Electric Corporation, Radio Corporation of America, Toshiba, and Philips.

To obtain a complete raster scanned binary image with a linear imaging device, the device is often coupled to a paper transport which moves paper containing the image to be sensed past the array. In all cases, the analog video output signal has to be sampled and converted to binary form by circuits of well-known design. Entire assemblies are available commercially that, by using one or another of the above cited devices, will deliver a complete raster-scanned binary image.

Active devices in the above sense include flying spot scanners, drum scanners such as produced by Optronic, and flat bed laser scanners such as the AM-ECRM 8400 Autokon II.

A preferred method of digitization is the use (see FIG. 2) of an AM-ECRM Autokon which is interfaced to a mini-computer. The Autokon at a magnification setting of M=1 digitizes at a density of 722 dots per inch and 722 lines per inch. In one realization of the invention, the magnification is set at M=0.83 so that the density of digitization is as close to 600 dots per inch as is possible with minimal magnification increment of 0.01. In this way, after a 2:1 reduction is achieved by geometric manipulation, the dot density is reduced to 300 per inch which is the print density of the Xerox 9700, the preferred output device.

Output

The output of the method and apparatus that is the subject of this invention is a sequence of code symbols of two kinds. The first kind of symbol sometimes known as a "metafunction" instructs the output device where to position sub-sequences of PATs, the second kind of symbol. Each PAT in turn represents a unique set of dots or equivalent elements from which images are reconstituted. In one realization of the invention, each of the first type of output symbols is the name of either an 8×8 matrix of dots, (each matrix comprises one PAT) each of which may be black or white or else of a certain combination of such matrices. In one embodiment of the invention there are 235 distinct such PATs and I have found that these 235 PATs suffice to reconstitute most original line drawings with adequate fidelity.

In one embodiment of the invention the output device is a Xerox 9700 laser printer which prints at 2 pages per second. It can only be controlled by directions to print characters, each of which is stored in the memory of the printer. Each character corresponds to a PAT of this invention.

Display and Reproduction

An important aspect of the invention is that the pictorial information is coded in such a form that it is immediately available for efficient display and reproduction. To display or print efficiently it is necessary to command the device to generate a sequence of display or print elements (PATS) so as to reduce the number of separate commands and actions that need to be taken per unit time. Traditionally, such an aggregate of display or print elements (generally dots or strokes) to create a symbol which conveys meaning is called a character and a means for displaying a character as a single entity is called a character generator. In impact printing, each character consists of an entire form in the shape of the character. In dry laser printing or in laser or CRT photo typesetting the character is formed by having the laser beam or the electron beam in a CRT trace out and fill in the shape of the character. In all of these cases, the number of characters is relatively small and considerable care is expended by the designers to make the process of positioning the character efficient.

With a hierarchy of characters, the meanings of which have been previously defined, one is able to significantly reduce the amount of information that must be transferred in order to reproduce an image. The amount of reduction in this information is directly dependent upon the efficiency with which a selected group of characters represents an image. The limitations of the equipment used to reproduce the image in turn impact the choice of characters. Thus a printer with a limited internal data transfer rate would not effectively reproduce an image using a character set (or "font") consisting of two elements, one black dot and one white dot. Even when there is no such limitation the use of an efficiently chosen character font allows more efficient reproduction of the image.

Figure 4:
FIG. 4 shows an image produced on the Xerox 9700 in accordance with this invention.
Figure 5:
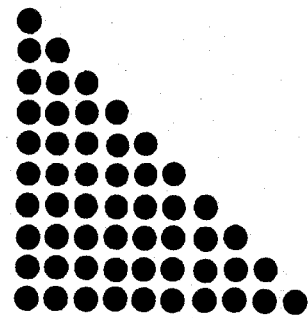
FIG. 5 shows a typical picture atom made up of dots.
Figure 6:
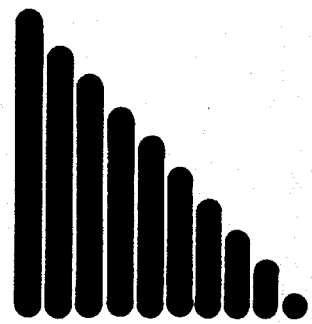
FIG. 6 shows a picture atom of FIG. 5 made up with strokes.

In accordance with this invention, a unique set of characters (a "font," each character of which comprises an aggregate of display or print elements such as dots or strokes) is provided so that pictures can be printed or displayed with them. In a preferred embodiment of the invention, 235 characters of which 200 are shown in FIGS. 3a and 3b have been selected and with these characters pictorial material such as exemplified in FIG. 4 has been printed on the Xerox 9700, a laser dry process printer. FIG. 5 exemplifies how one of the characters can be made up of dots and FIG. 6 shows how the same character can be composed with elementary strokes. The method of this invention can also be applied to display or reproduce pictorial material on other output devices such as CRT displays, photo typesetters, laser printers and impact printers.

A font historically comprises a set of symbols all in the same style, including upper and lower case letters or alphabetic symbols and the numbers 0 through 9. The usual punctuation symbols such as periods, colons, semicolons, question marks, and exclamation points are provided. Special symbols used commercially, such as dollar signs, pound signs, cent signs, yen signs, as well as symbols used typically in the printing of books, such as symbols used to indicate footnotes, such as crosses, asterisks and numerals in small format are also provided. The generally accepted number of symbols in the prior art in a complete font is on the order of 100. Keeping this in mind, and recognizing that computer structure generally favors powers of 2, 256 possible symbols are typically provided in an image transfer and printing system. For example, the Xerox 9700, used in one embodiment of this invention has capacity for 240 different font symbols (16 additional bytes are reserved for "metafunctions"). This allows the identification of any one of 256 different font elements with merely one byte of digital information.

Transformation of a Binarized Image into a Sequence of Characters

Figure 7:
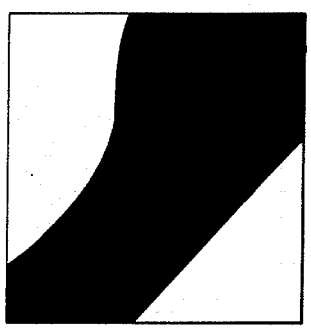
FIG. 7 shows a minute portion of a black and white image.
Figure 8:
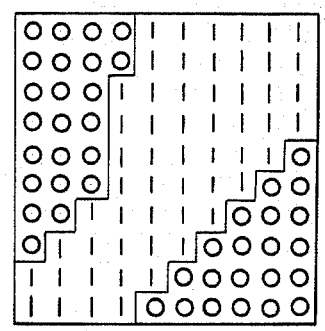
FIG. 8 shows the image of FIG. 7 represented as 0's and 1's with the boundaries there between, and particularly shows the need for the unique three-area two-boundary picture atom in accordance with this invention.

The use of the invention is illustrated by the following specific example. An image has been digitized in binary form using well-known prior art techniques. That is, the image is represented in memory by strings of zeroes and ones with each string representing a row, each "zero" representing a white dot and each "one" a black dot. FIG. 7 represents a minute portion of an image. FIG. 8 represents this image reduced to zeroes and ones in a rectangular array and FIG. 9 shows how the two-dimensional array of zeroes and ones is stored as a linear sequence in the memory.

Figure 10:
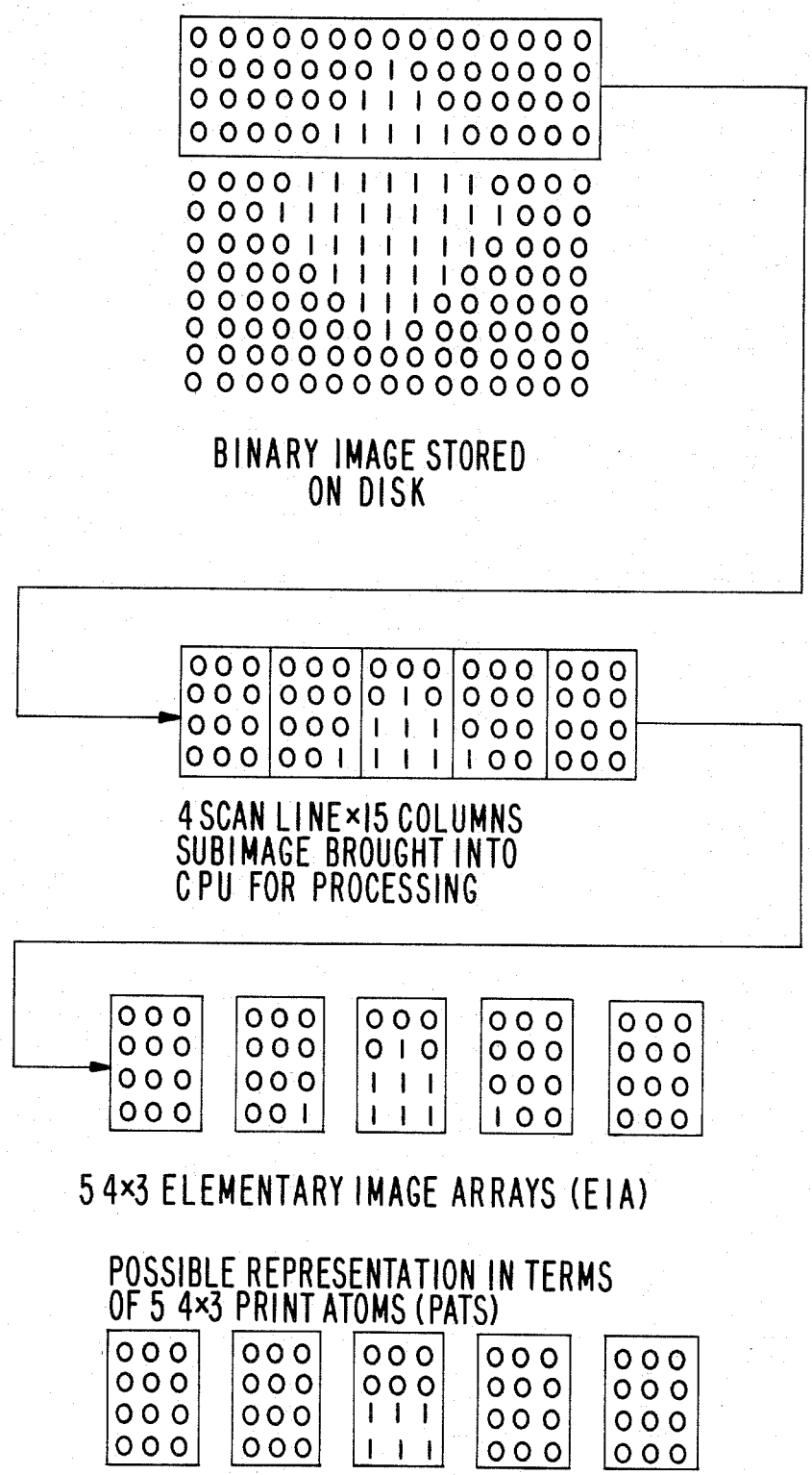
FIG. 10 illustrates the possible representations in terms of five $4 \times 3$ picture atoms.
Figure 12:
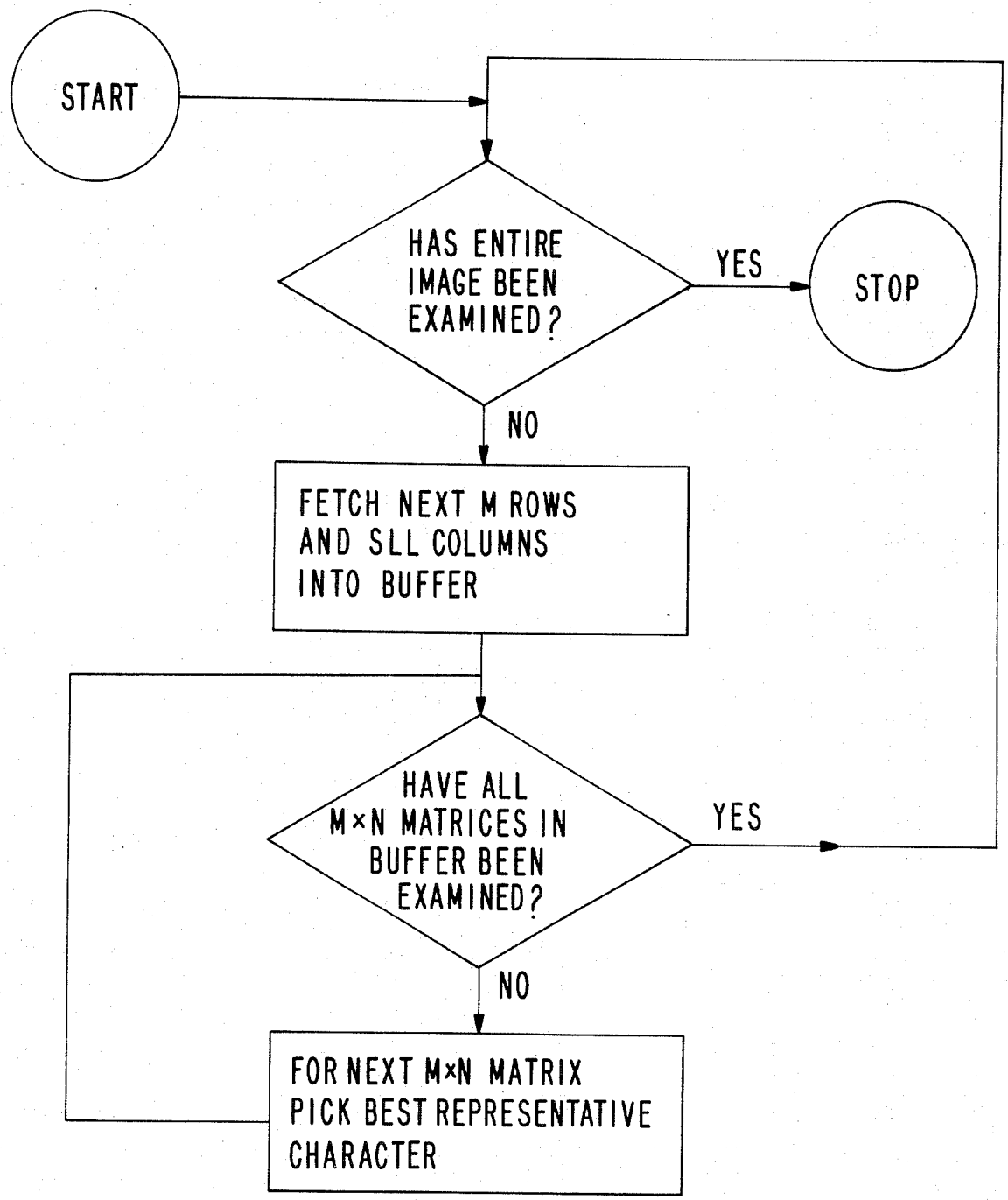
FIG. 12 shows a flow diagram of the method of this invention.
Figure 13:
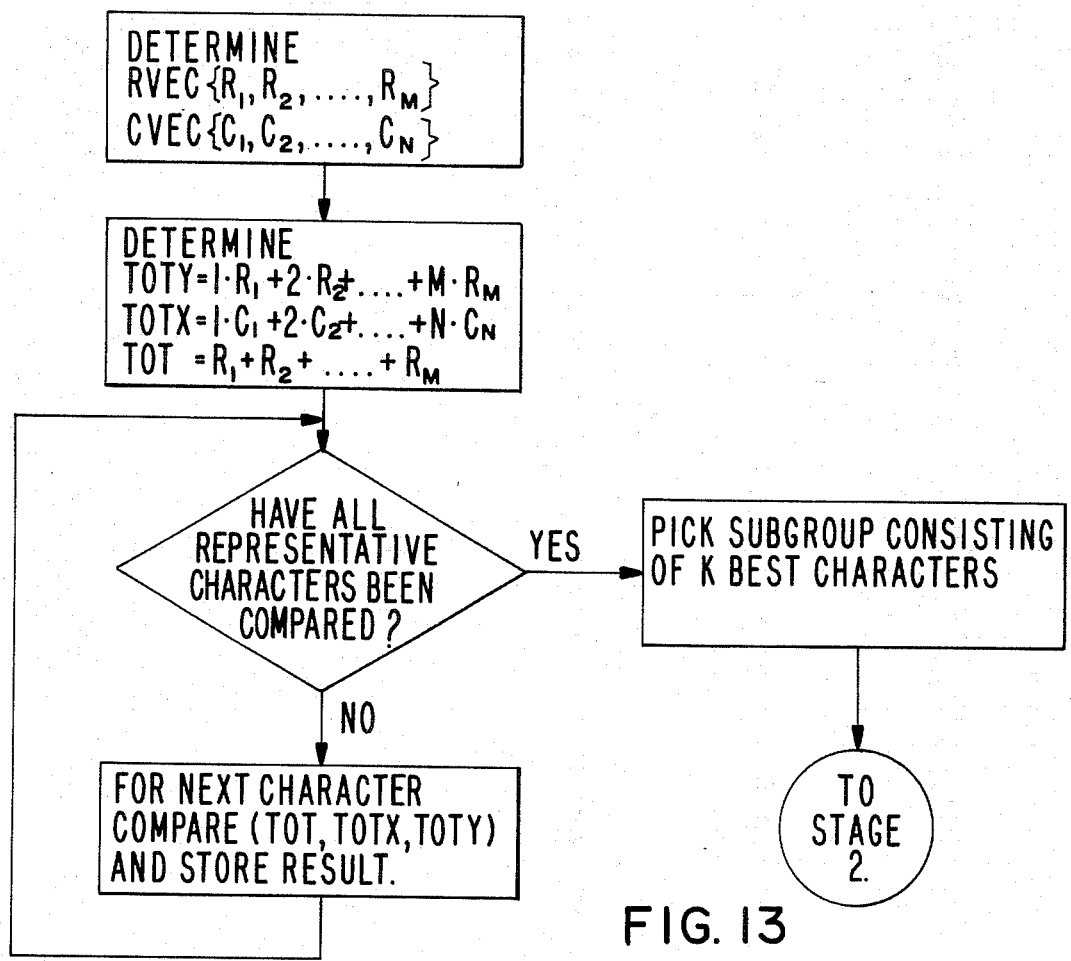
FIG. 13 shows the algorithm for determining the measures used to characterize a picture atom and to character a subpicture or subregion of the image for the purpose of matching the two and the logic used for carrying out this match.
Figure 14:
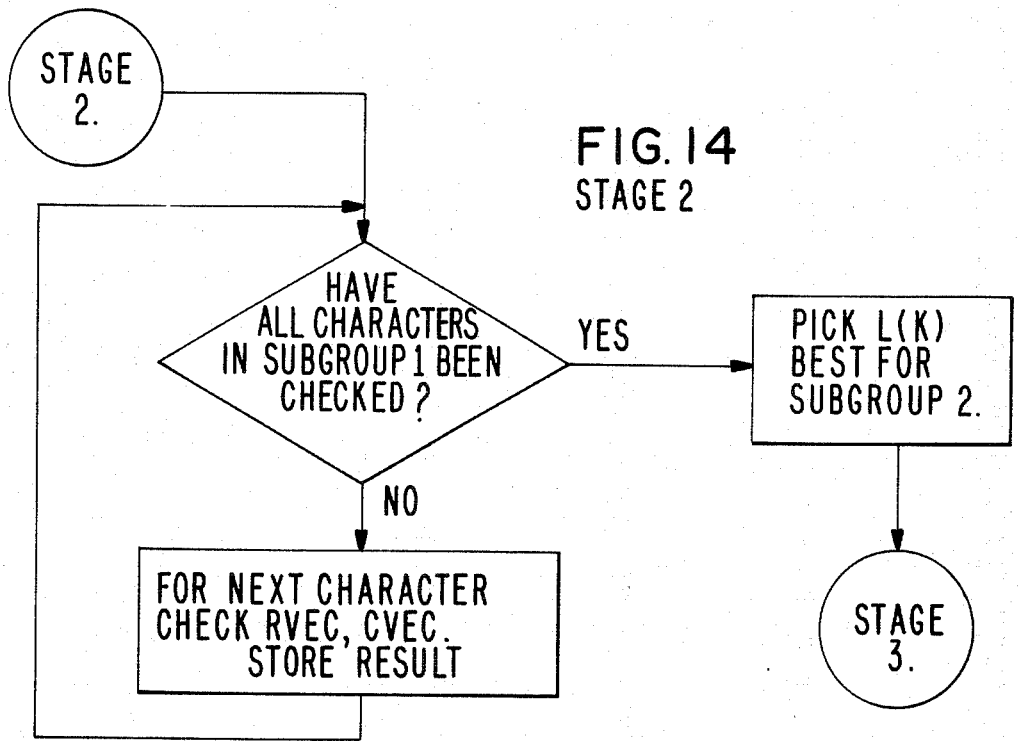
FIG. 14 illustrates the technique for reducing the number of picture atoms suitable for representing an image subpicture when more than one picture atom is suitable for this representation as a result of the first test.

The first step (See FIGS. 10 and 12) in transmitting the image is to read successive portions of the image into a random access memory for processing.

The first such portion consists of the first M lines of the image; the second such portion consists of the second M lines of the image and each subsequent portion of the image consists of an additional grouping of M consecutive lines. The value of M is selected as a matter of convenience to simplify the computations and operations of the computer system being used to assist in the transfer of the image. Typically, M is 16 if the operations associated with the transfer of the image are performed on a computer having 16 bits per word. Other computers which use eight bits per word would require M to be eight for optimum processing. It should be made clear, however, that in no case is there a theoretical restriction on the value of M, but rather merely those practical restrictions dictated by operational economy of the particular system used to transfer the image.

While commonly a "line" refers to a geometrically contiguous series of dots selected from a portion or subpicture of the image which lies along a straight line, conceptually, of course, a line can be any selected sequence of image portions whether or not the image portions are sequential in the actual image or picked randomly from various regions in the image, so long as each image portion can be properly placed in the reconstructed image. Thus, the concepts of this invention are appropriate for use in systems which "scramble" the image being transmitted for security purposes. Each portion consists of at least one but possibly several rows of zeroes and ones comprising a rectangular array of M rows and N columns where N is a multiple of a basic column dimension and M is a multiple of a basic row dimension. In one example the basic row and the basic column dimensions are both equal to 16. The reason for this choice is dictated only by the 16 bit word structure of the mini-computer used in one example. N in the case of the example ranges from about 640 for a 1" picture to about 6400 for a 10" picture. FIG. 11 shows the content of a buffer containing 16 rows and 48 columns of a binary image which content is ready for processing as three 16×16 arrays.

The second step is to choose for each of the binary matrices representing an image subpicture, a close representative among a small number (235) of typical arrays (characters or PATS) (see FIG. 3 for a typical set of such characters in accordance with this invention) and to indicate this choice by means of an identifying number (one byte). Sufficient information is also generated in a well known manner to record the relative position of the character in the complete binarized image. The method for choosing a particular PAT to represent a subpicture of the image is a combination of elementary procedures. The use of all or selected ones of these procedures is a matter of choice dictated by practical considerations.

The first procedure consists of extracting selected information from each digitized array representing a subpicture of the image. The information consists of the total count of black dots in the array (TOT) the total counts of black dots in each row (RVEC) and in each column (CVEC) of the array, and measures of the row "center of gravity" (TOTX) and the column "center of gravity" (TOTY) as defined below.

For each one of the typical characters in the font an array of dots has been previously determined and the comparable information for this array is stored in a memory called character store (CS).

The row "center of gravity" (TOTX) and the column "center of gravity" (TOTY) for each array representing a subpicture and for each array representing a font character (a PAT) are calculated using the formulas:

$$TOTY = 1\times \text{Number of black dots in row 1}$$
$$+2\times \text{Number of black dots in row 2}$$
$$\vdots$$
$$+M\times \text{Number of black dots in row M}$$

$$TOTX = 1\times \text{Number of black dots in column 1}$$
$$+2\times \text{Number of black dots in column 2}$$
$$\vdots$$
$$+N\times \text{Number of black dots in column N}$$

where TOT = number of black dots in the $M\times N$ array, X is the row coordinate of the center of gravity and Y is the column coordinate of the center of gravity.

In one realization, the two parameters M and N have both been taken to equal 16.

The choice of the representative character is carried out in three stages. First a subgroup of characters is singled out by virtue of close agreement between the three characteristics TOT, TOTX, and TOTY as derived from the $M\times N$ image subpicture array and the representative characters in the font.

After a small group of candidate representative characters has been singled out (limited in the preferred embodiment to at most the closest five characters or only those characters within specified bounds, whichever is less, but in no event less than one character), the next stage in the selection procedure begins.

In the second stage, the choice is narrowed to an even smaller group of characters by comparing RVEC and CVEC as derived from the $M\times N$ image array to RVEC and CVEC for each of the representative font characters. RVEC and CVEC are defined as follows:

$$RVEC = m_1, m_2, \ldots, m_M$$

$$CVEC = n_1, n_2, \ldots, n_N$$

The second test comprises comparing on a row by row and column by column basis $RVEC_{PAT}$ to $REVC_{subpicture}$ and $CVEC_{PAT}$ to $CVEC_{subpicture}$ and deriving two measures of the dissimilarity between a subpicture and each PAT. These two measures for each PAT are:

$$DISS_{row} = |m_1 - m'_1| + |m_2 - m'_2| + \cdots$$
$$+ |m_M - m'_M|$$

$$DISS_{col} = |n_1 - n'_1| + |n_2 - n'_2| + \cdots + |n_N - n'_N|$$

where the superscript "'" denotes the indicated quantity is taken from the subpicture and the absence of the superscript means that the quantity is taken from one of the PATS.

That group of PATs possessing $DISS_{row}$ and $DISS_{col}$ less than specified values or, alternatively, that group of a specified number of PATS having the lowest values for these two quantities are selected for further analysis should this group consist of more than one PAT.

Figure 15:
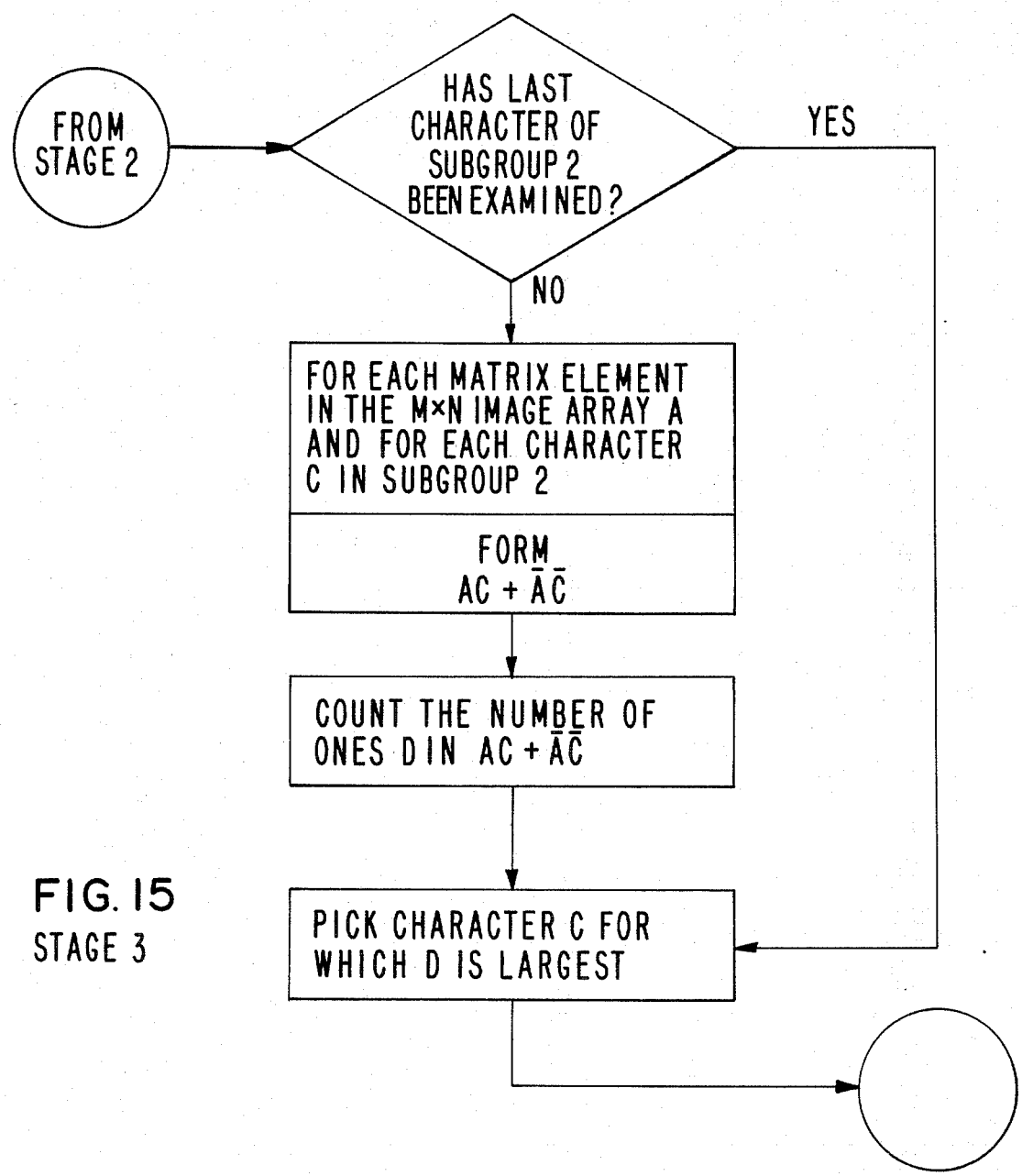
FIG. 15 illustrates the last test applied to determine the appropriate picture atom used to represent an image subregion when more than one picture atom satisfies the test of stage 2 in FIG. 14.

After the completion of the second stage, there may still not be a complete assignment of characters; that is, it may happen that the selected subgroup may still contain two or more representative characters. If this happens, the final stage (FIG. 15) of the selection process is invoked.

This final stage consists of counting for each of the representative characters remaining in the subgroup the number of dots that have the same color as the dots in the corresponding positions in the $M\times N$ image subpicture array. That representative character is finally chosen for which this number is the largest. This count can be realized by forming the logical function $$A\cdot C + \overline{A}\cdot\overline{C}$$

for each element in the array A and the candidate representative character C. The resulting array (called BETAM in the program listing) will have a logical 1 at each position where the corresponding dots have the same color and a logical 0 at each position where the corresponding dots disagree in color. Alternatively, by counting the number of dots which have different colors, a faster determination can be made since there are fewer of these dots. This implementation is realized from the following logical function:

$$A\cdot\overline{C} + \overline{A}\cdot C$$

The Selection of a Set of Font Characters (PATS)

The selection of a set of font characters is an integral part of the invention. Since the principle underlying the invention is the approximation of a digitized image by an arrangement, depending on the particular image to be approximated, of a small number (in most realizations 235 or less) of characters making up a font, the proper selection of the set of these characters is crucial. The selection is based on an analysis of the material that is to be represented. The analysis below exemplifies the considerations as they apply to general line drawings although parallel techniques are applicable to other kinds of material, such as alphanumeric print, which is a special case of line drawings, and half-tones used to represent continuous tone material for printing.

The preferred embodiment of this invention uses the Xerox 9700 laser printer. This printer prints characters in response to the bytes stored in its limited memory which has a 24,000 byte capacity. The printer must print the whole page from memory. Printing a text is no problem because to print an ordinary page of text requires on the order of 2400 characters represented by only 2400 bytes in memory. Thus the memory has excess capacity for the printing of a page of text. Once the memory is loaded, however, the printer prints in accordance with the instructions contained in memory and the memory cannot be updated during the printing of one page. This limitation is not a problem in the printing of text because up to several pages of text can be printed from the characters stored in memory before the memory need be reloaded. However, in printing an image other than text, the memory limitation becomes serious. Typically, if the image is to be reproduced using the dot by dot approach, as in the prior art, then at least about one million bytes corresponding to 8 million bits is required to print one page. Clearly a 24,000 byte memory cannot be used to print one page of image in this prior art manner. This invention overcomes this limitation by providing a character font which is particularly useful in reducing the number of bytes necessary to represent the image to be reproduced on a page. As part of the process of reducing the number of bytes to be used in memory a special trick is employed. In determining which particular character in the set of characters making up the font shall be used to represent an image subpicture, a special 16×16 dot array is used for the purpose of representing each character in the font. This array is then used to calculate the parameters described above (TOT, TOTX, TOTY, CVEC and RVEC) for the purpose of determining the proper character to represent a given image subpicture. The information relating to this character is then transmitted to the printer. The printer, however, prints out the identical character in its memory using an 8×8 dot array thereby substantially reducing by ¼ the total number of bytes required to represent each character in the font in the printer memory. This increases the effective capacity of the memory by a factor of 4.

For the purpose of this application, the set of dot arrays used to represent the font characters at the transmitter is denoted as "Stored Representation Arrays" also abbreviated as "SRAs". The set of arrays used to represent the characters in the font at the receiver are denoted as picture atoms or "PATs". It should be understood that each PAT can be an 8×8 dot array or alternatively a 4×4 dot array up to a 16×16 dot array depending upon the memory capacity available and the resolution desired.

In one method of selecting an SRA (i.e., in selecting a specific set of characters to make up a font) a large number of image subpictures (also called elementary image arrays or "EIA") were displayed on a CRT screen by means of a special computer program. These EIA's consisted of square arrays of various dimensions (6×6, 8×8, 10×10, 16×16) digitized at sampling densities varying from 300 dots per inch to 1,000 dots per inch. A sampling resolution of 600 dots per inch was selected from the various resolutions available because it gives a minimal loss of detail while being matched by a factor of 2 to a printing resolution of 300 dots per inch on the printer (Xerox 9700) under consideration. This resolution corresponds to a subpicture area on the output of 0.0267 in.×0.0267 in. so that a square inch of output may contain as many as 1,406 SRA's.

The initial criterion for selecting a set of SRA's for the representation of line drawings was that the set should contain most of the projections on the small areas of typical lines in various orientations and thicknesses, and at arbitrary positions within the squares. By detailed examination of many displayed elementary image arrays an optimum set of SRA's was tentatively selected.

After tentative selection of a set of SRA's, a set of statistics was compiled showing frequency of use of each SRA and it was found that some SRA's were used commonly and others were used only rarely. These SRA's that were used very commonly were split. For example, if an SRA represented a vertical line segment and this vertical line segment occurred frequently, all of its shifted versions at various thicknesses were added to the set of SRA's. SRA's that were very rarely used were eliminated. It was also discovered that some SRA's representing two or more lines in one array ought to be added to the set of SRA's because of their frequency of occurrence. A set of SRA's selected in this manner that gives good performance with most line drawings is shown in FIGS. 3a and 3b.

The same approach described above can be used to prepare sets of SRA's that are particularly suited to certain drawings. For example, a set of line drawings that consist mostly of rectilinear segments that are well separated except at intersections will be best represented by a different set of SRA's than those that are selected for the rendition of curvilinear material such as signatures.

In order to minimize the effect of limitations that exist on some printers (e.g., the Xerox 9700) with regard to the total number of SRA's that can be printed on one page or to take advantage of the desirability of performing the printing in a minimal time on other printers (e.g., phototypesetters like the Mergenthaler Linotron 202, et al.), SRA's can be combined to create large characters for the representation of larger areas containing a homogeneous pattern (white, black, stipled, etc.) or they can be split to afford more accurate representation of complex elementary image arrays. Thus to obtain greater accuracy in reconstructing the image, each SRA can be split into a number of smaller arrays. For example, each SRA typically is a 16×16 dot array. By splitting an SRA into a smaller number arrays, one can obtain two 8×16 arrays or four 8×8 arrays which when taken separately can be used to more accurately depict the resulting image, particularly on boundary areas adjacent changes of the image from one color to another. The overriding rule, however, is that the total number of SRA's must be within the number of characters suitable for use in the font as dictated by the limitations on memory capacity of the printer. The only detriment to this strategy is the requirement that if the number of bytes used to represent the characters in the font exceed 256, additional bits of information must be transmitted to represent these characters. Thus if 1,000 characters are used in a font, 10 bits of information are required to represent the characters rather than a byte. With the Xerox 9700, two additional bytes of information must be transmitted to indicate first that a change in font has taken place and second to identify the particular font replacing the previously used font. Although the use of two bytes for this purpose is somewhat inefficient, this use is dictated by the constraints of the system. The selection of white and black super SRA's obtained by combining SRA's is separately discussed.

Figure 16:
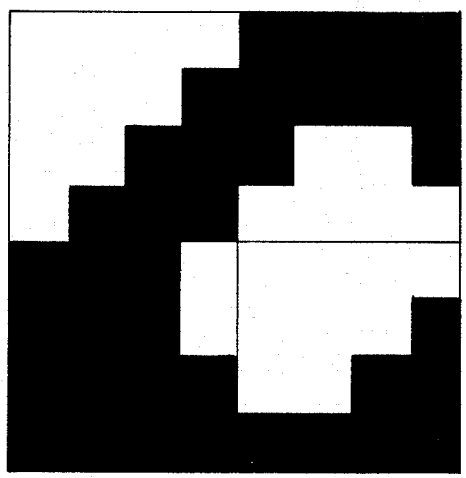
FIG. 16 illustrates the super picture atom in accordance with this invention consisting of four picture atoms of two colors each.

In the above example, each of the SRA's is of the same size. In another realization of the invention this is not the case. After an initial coding of the binary image into a series of characters, selected SRA's are assembled into super SRA's consisting of two or more adjacent SRA's of the smaller size. This procedure has the advantage that the total number of SRA's used to represent a given image is reduced over the number that would have been required if no super SRA's had been employed. Or, conversely, by employing a set of SRA's in which each SRA is smaller and therefore capable of rendering a more faithful reproduction of the artwork, the use of super SRA's makes it possible to stay within the limitations on total number of characters per page capable of being stored in the memory of the printer and yet achieve the desired higher quality of the reproduced image. FIG. 16 shows, by way of example, how a super SRA is constructed from four adjacent SRA's.

The Selection of White and Black Super Characters

After each image subpicture (i.e. each Elementary Image Array) has been identified with an SRA, the great majority of SRA's (about 90% in the case of line art), will have been found to be white, and a lesser but still substantial fraction, will have been found to be black rather than mixed patterns containing both black and white dots in large numbers. The EIA's that are identified as white or black will vary frequently occur adjacent to each other. In order to reduce the total number of characters employed in representing an image and thus stay within the limitation on the total number of characters per page (circa 20,000 for the Xerox 9700) super SRA's can be designated which consist of sequences of adjacent white or sequences of adjacent black characters. The problem is then how to make the selection of super SRA's. This selection procedure will now be described.

Suppose that a total of M supercharacters is available to represent sequences of adjacent white characters. (Analagous considerations will apply to black.) A statistical examination of line drawings shows that the frequency of adjacent white characters generally decreases with the number of characters. That is, there is a large percentage of 1, 2, 3, ..., 12, 13 all white characters that are adjacent and a much smaller percentage of larger numbers of adjacent white characters. In three pieces of line art more than $\frac{2}{3}$ of all adjacent white characters occurred in sequences of 13 characters or fewer in length.

Let us reserve sequence lengths of 1, 2, ..., K, $2K+1$, $3K+2$, ..., $(L+1)K+L$ as all white supercharacters. We wish to choose K and L so that $K+L=M$ where M equals the number of white supercharacters and L is the number of additional supercharacters in excess of the Kth character, and no more than M supercharacters need to be used to represent the longest sequence of white that might occur. K represents the length of the last consecutively increasing supercharacters. With N or fewer supercharacters we can represent all sequences of length less than or equal to $[(N-1)L+N]K+(N-1)L$ ordinary characters. Since we required that $L+K=M$, we have $K=M-L$ and thus $[(N-1)L+N](M-L)+(N-1)L \leq S$ where S is the length in ordinary characters of the longest sequence. For example, let us take an image that is 10" wide. The longest possible white line is 375 characters long. Take $M=25$. Then with $N=3$, i.e., no more than three supercharacters need be used, $L=12$ and $K=13$.

With these choices, lengths 1, 2, ..., 13, 27, 41, 55, 69, 83, 97, 111, 125, 139, 153, 167, 181 are encoded using one all white supercharacter. Thus, in the example shown in FIG. 4, 73% of all white sequences were encoded using one supercharacter. Lengths 14, 15, ..., 194, 208, 222, 236, 250, 264, 278, 292, 306, 320, 334, 348, 362 were encoded using two characters. This includes 26% of all the white spaces. The remaining 1% of white spaces was encoded using three all-white supercharacters.

In the particular example, the expected number of all white supercharacters needed to encode white sequences is 1.28 per white sequence as compared to three bytes per white sequence using metafunctions. This provides a great saving because in the normal reproduction of an image on a page, about 9,000 metafunctions are required. By using all white supercharacters selected as provided above, the number of bytes required to reproduce the image is significantly reduced. Thus the above cited example experienced a reduction per white sequence to 1.28 supercharacters each of which is represented by a byte. Thus a saving of about 1.7 bytes per white sequence is realized. For an image which absent supercharacters required 9000 metafunctions the resulting saving of 5000 bytes represents 20% of the alloted number of bytes.

To deal with black SRA's let $M=10$, $S=375$. We find $L=4$ and $K=6$. In one example 97% of all black sequences require only one super SRA with this choice. 2.5% require two super SRA's. The average number of SRA's required is 1.04. In another example the average number is 1.05.

The same principle of aggregating simple SRA's into super SRA's in order to reduce the total number of required SRA's can be extended to the direction orthogonal to the raster line direction as well as to other statistically significant combinations in addition to black and white sequences.

Optimal Selection of Supercharacters

For efficient representation of sequences of adjacent black PATs it is important to combine them into supercharacters and then to replace every sequence of adjacent black PATs by a shorter sequence of optimally chosen supercharacters. The smallest number of bytes will on the average be required to represent an image if the average length of the sequence of supercharacters needed to replace the sequence of all black PATs is the smallest possible. Since in contradistinction to the case of sequences of adjacent all white PATs in which a metafunction of three bytes can represent a sequence of any length and, therefore, supercharacter sequences of length greater than three should not be considered, with sequences of all black PATs and their replacement by sequences of supercharacters there is no such restriction and unlimited lengths are theoretically allowed. In practice, there is a limit to the length of sequences of supercharacters.

Suppose that all sequences of adjacent all black PATs of lengths between 1 and K are represented by one supercharacter. Let all sequences with lengths $2K+1$, $3K+2$, ..., $(L+1)K+L$ also be represented by one supercharacter. Then all lengths between $(L+2)K$ and $(2L+3)K$ can be represented by two supercharacters, all lengths between $(2L+3)K$ and $(3L+4)K$ by three supercharacters, and in general all lengths between $[(N-2)L+N-]K$ and $[(N-1)L+N]K$ by a sequence of N supercharacters where N may take on values 1, 2, 3, ....

Suppose that $F_N$ is the frequency of those sequences of all black adjacent PATs where lengths are less than or equal to N. The the average or expected length of the sequences of supercharacters that replace sequences of PATs is given by $$E(K,L) = 1(F_{L+2}) - F_1)2(F_{(2L+3)K} - F_{(L+2)K}) + 3(F_{(3L+4)K} - F_{(2L+3)K}) + \cdots + N(F_{((N-1)L+N)K} F_{((N-2)L+N-1)K}) + \cdots$$

The quantity $E(K,L)$ is now made to be as small as possible by choosing an appropriate pair K,L subject to the condition $K+L=M$. The quantities $F_1$, $F_2$, ... are known from observation and calculation with actual images.

The number of bytes saved by using all black supercharacters was less than one percent of the total. The optimal selection, moreover, made possible the best apportionment of the limited total number of characters in a font between simple PATs, and black and white supercharacters.

Structure

Figure 17:
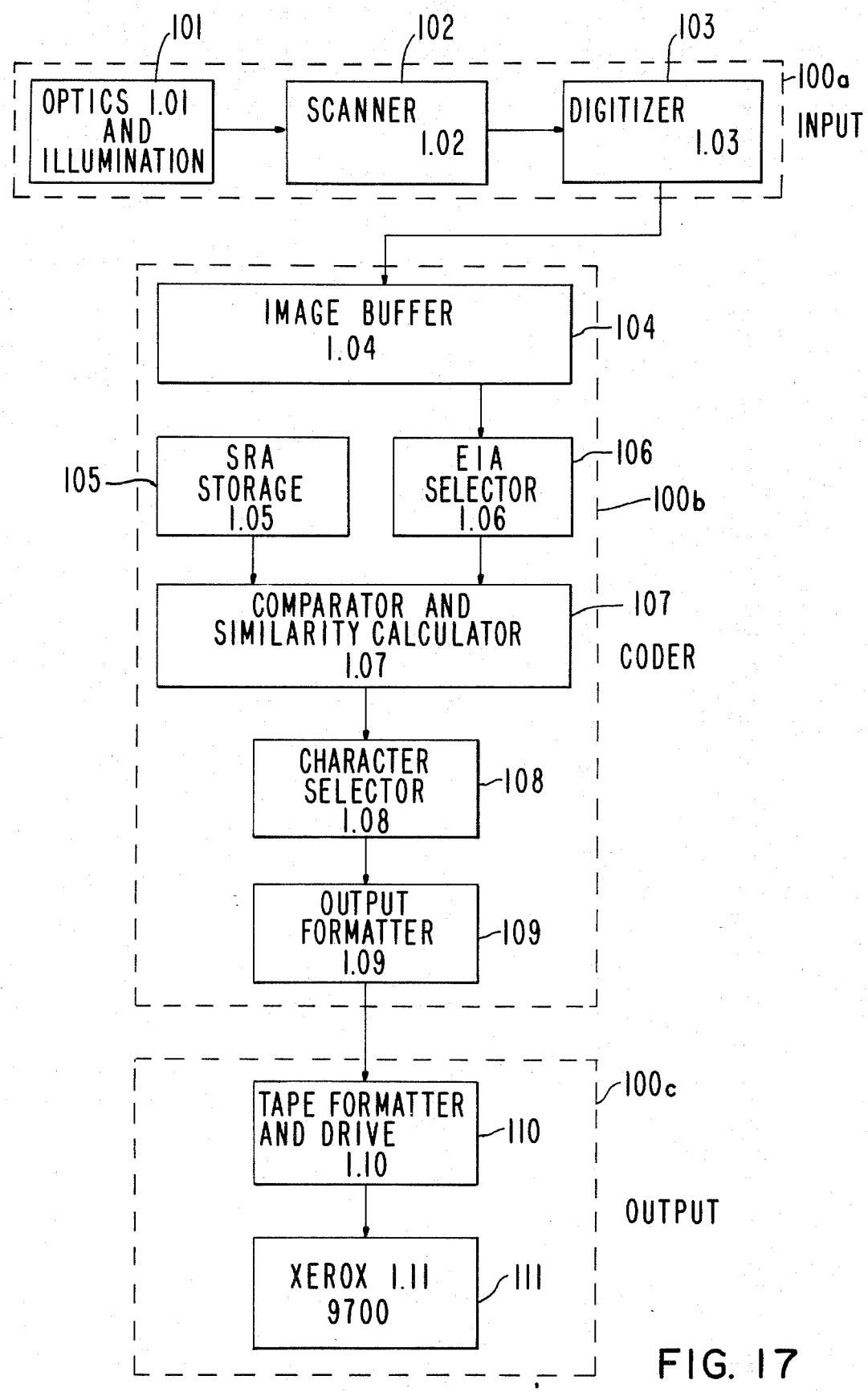
FIG. 17 illustrates one embodiment of structure for implementing this invention.

A realization of the present invention is shown in the block diagram of FIG. 17. In section 100a titled input, three boxes 101, 102 and 103 indicate schematically three functions that are performed to produce from pictorial material a sequence of electronic pulses representing that material. The optics and illumination 101 serve to project an image of the material on the scanner 102. Scanner 102 and its motion relative to the pictorial material are so arranged that the image is converted into a sequence of parallel lines depicting the picture, each such line being further decomposed at the digitizer 103 into a sequence of pulses of two kinds, the first kind, denoted by 1, representing elementary areas on the image that are essentially black and the second kind, denoted by 0, representing elementary areas on the image that are essentially white.

The sequence of signals corresponding to the pulses is stored in a buffer memory 104 for subsequent processing. Since the amount of memory to store an entire picture is very large [8.5"×11" at 300 dots/inch resolution corresponds to about 1M byte of memory] it is of economic importance to organize the processing in such a way that the least possible amount of storage need be used. The method of doing this will be described in connection with FIG. 18.

A matrix selector 106 chooses a sequence of Elementary Image Arrays (EIAs) from the image buffer 104 and each one of these arrays is compared as described above, in the similarity calculator 107 with each one of a set of Stored Representation Arrays (SRA's) in the character storage 105. The most representative character in the set of SRA's for a given EIA is selected by the character selector 108 and is combined with other information needed to indicate the font of characters as well as positioning information in the output formatter 109.

The sequence of PAT's, font identification and character location (explicit or implicit) is passed on to a tape formatter and drive unit 110 to be written on magnetic tape. This magnetic tape is then mounted on the Xerox 9700 input tape drive for reproducing the image. Prior to using a data tape, the font containing the representative characters must have been loaded into the system disk on the Xerox 9700. Data is also in some cases passed to the Xerox 9700 over a cable and interface rather than by magnetic tape.

In order to describe the encoder in detail, let us set down the specifications of the input that flows into the image buffer 104 from the digitizer 103. The input consists of a number of sequences of pulses, each sequence representing the result of scanning a line and each pulse representing a bit, one for black and zero for white. The polarity or the height of the pulse serves to distinguish between the two values of the bit. The number of bits in each scan line (SLL) is the same for every scan line and is a parameter of the image. It is assumed that the number of rows in an elementary image array (EIA) is equal to M and that the number of columns in an EIA is N. It is furthermore assumed that there is an integral number of EIA's in the first M and every subsequent set of M scan lines so that N is a divisor of SLL. With these assumption it is possible to define an efficient organization for the image buffer 104.

Figure 18:
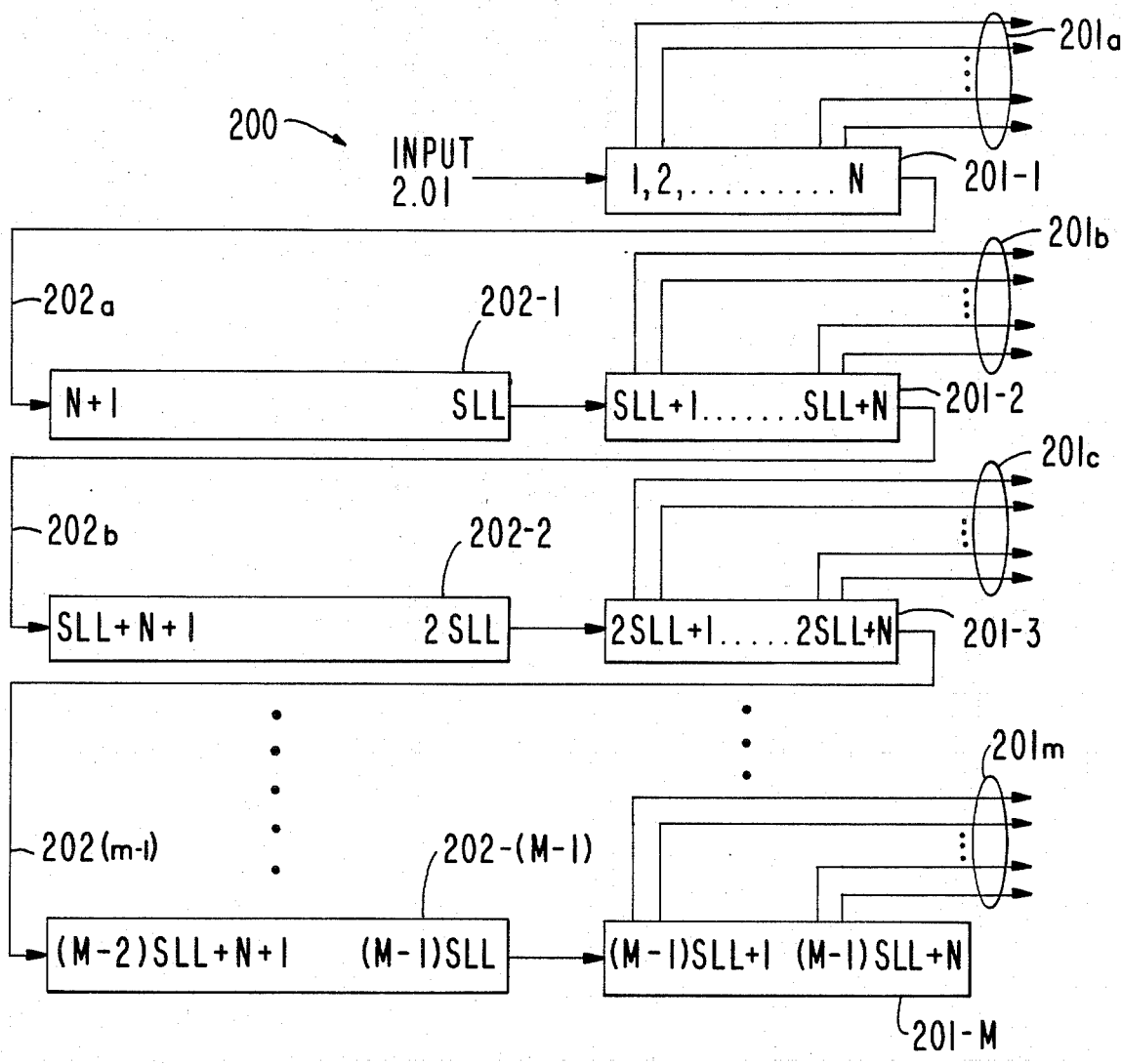
FIG. 18 illustrates an image buffer useful in implementing this invention.
Figure 19A:
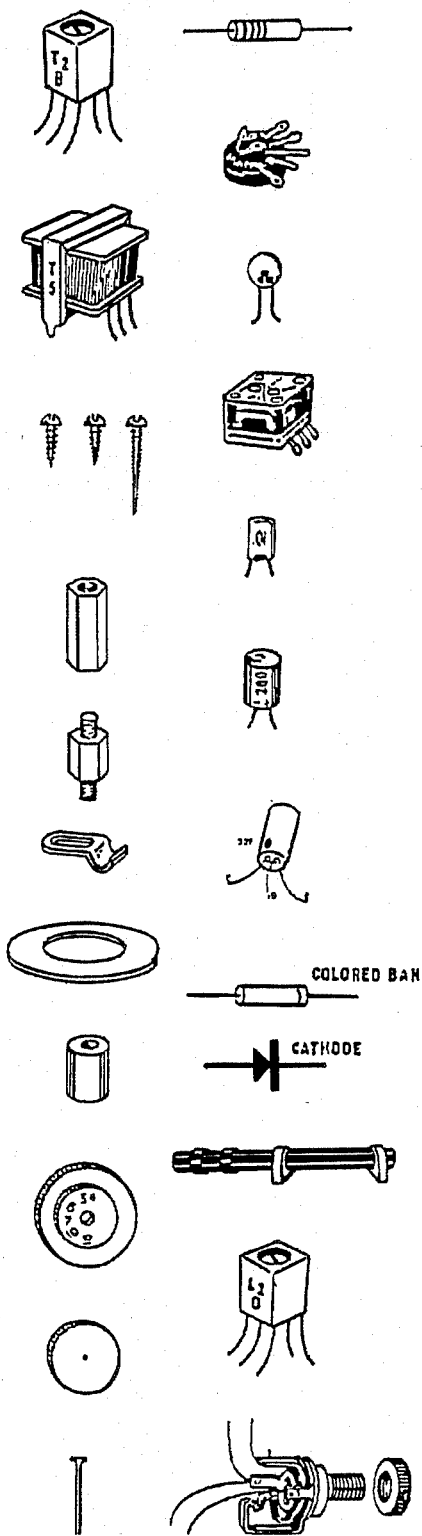
FIGS. 19a and 19b illustrate images reproduced using the character font of this invention.
Figure 19B:
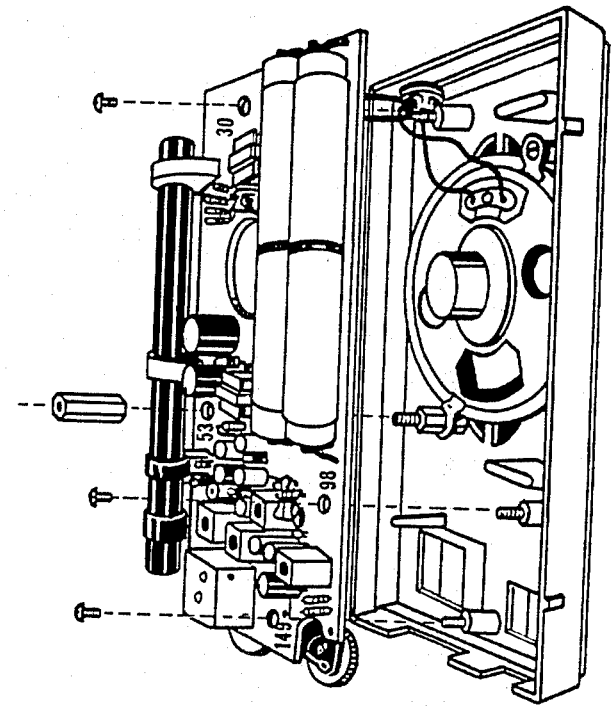

This can be done in two distinct ways, each of which represents certain advantages. The particular realization that is to be chosen depends on cost and performance specifications. The first way is to use an image buffer consisting of M serial to parallel shift registers, each of which is capable of holding N bits and M−1 serial to serial shift registers. For purposes of illustration FIG. 18 shows the structure of the image buffer 104.

The serial-to-serial shift registers are shown as 202−1 to 202-(M−1), and the serial-to-parallel shift registers as 201−1 to 201-M.

The operation of the image buffer proceeds as follows: The first input pulse is stored in location 1 of serial-to-parallel register 201. When the next pulse arrives, the first pulse is shifted to position 2 and the second pulse is placed in position 1. After an interval of $[N+(M-1) \text{ SLL}] \cdot T_1$ where $T_1$ is the time interval between two pulses on the same scan line, the first pulse will have reached position $N+(M-1)SSL$, the second pulse will be at position $N+(M-1) \cdot (SLL)-1$, and in fact the first elementary image array will be located at positions $$\begin{array}{llll}
1, & 2, & \ldots, & N \\
SLL + 1, & SLL + 2, & \ldots, & SLL + N \\
2SLL + 1, & 2SLL + 2, & \ldots, & 2SLL + N \\
\vdots & \vdots & & \vdots \\
(M-1)SLL + 1, & (M-1)SLL + 2, & \ldots, & (M-1)SLL + N
\end{array}$$

in reversed order with the first pulse occupying position $(M-1)SLL+N$ and the last pulse occupying position 1.

As each new pulse arrives at the input 201 it enters the shift register at position 1 while the last pulse is replaced by the preceding pulse and is thus lost from the system. When register 200 is fully loaded, then after an interval of time equal to $N \cdot T_1$ pulses representing the second of the elementary image arrays will have appeared in the positions corresponding to the serial to parallel shift registers 201−1 to 201−M.

After the initial M rows of the image array have been completely exhibited in the window 201, the first of the elementary image arrays of the second M rows will appear in the window after $((M-1)SLL+N)T$ additional seconds. (In these time estimates the periodic delays due to interscan line intervals $T_2$ have been neglected. The delay necessary to compensate for this flyback time can be calculated from FIG. 21 showing schematically the timing diagram of the scan time and the flyback time of the scanning device.) After $N \cdot T_1$ seconds, the second of the elementary image arrays will appear in the window. A similar event occurs $N \cdot T_1$ seconds later. Finally the third M rows are brought in, and so on, until the entire image has been displayed in the window or a counter provided for that purpose has reached MAX and the input is turned off.

The advantages of the above structure are mainly that no complicated addressing circuitry is required for addressing the particular bits making up a given Elementary Image Array for the purpose of selecting the proper character from a set of SRA's. This considerably reduces the complexity of structure otherwise required for keeping track of the various bytes which make up a given EIA. The use of standard RAM with addressing to bring together the constituent bits making up an EIA is the alternative approach to that disclosed above involving the use of the dual buffer structure. The implementation of standard RAM circuitry for this purpose is well known and thus will also not be described in detail.

Figure 1:
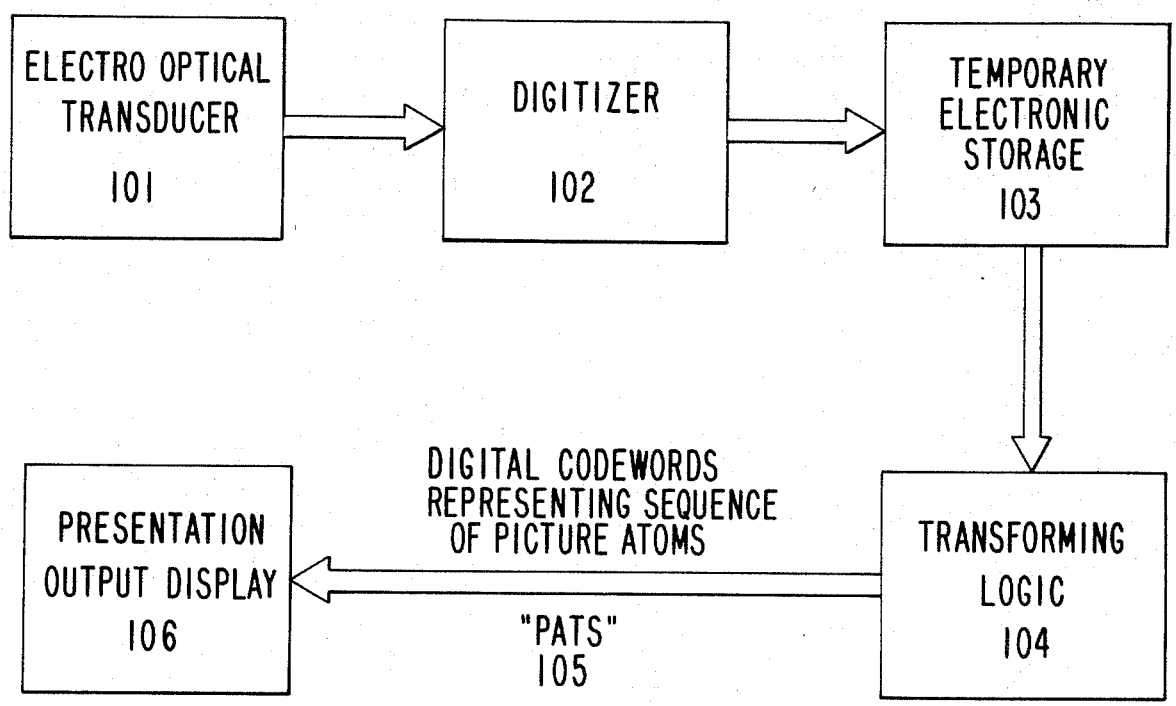
FIG. 1 shows the general layout of the structure of this invention.
Figure 2:
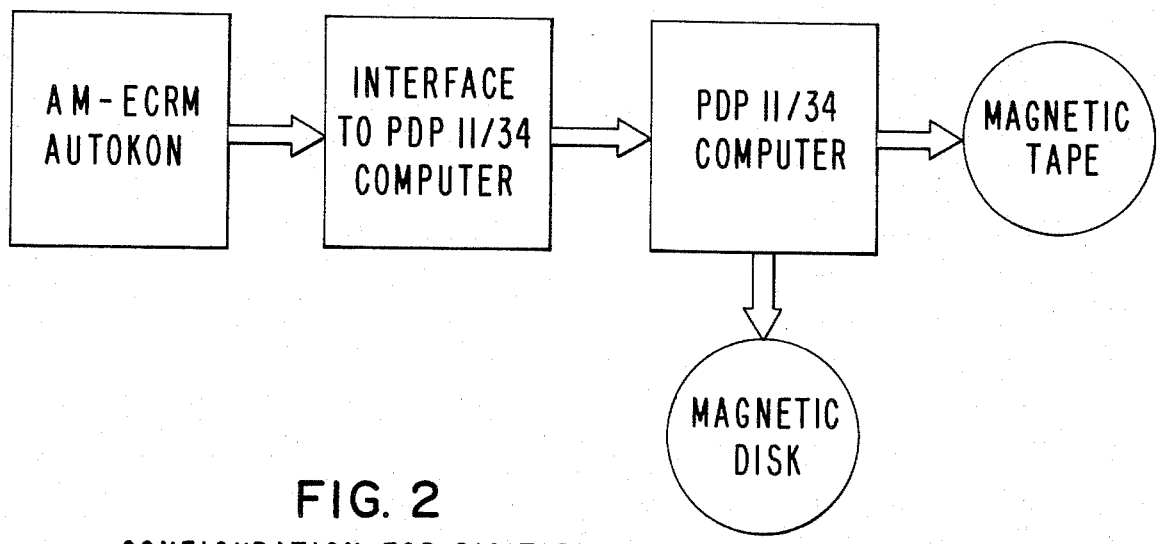
FIG. 2 shows a configuration for digitizing images and coding them for printing an output signal on the Xerox 9700 (a dry process, laser line printer driven by computer)

The preferred embodiment of this invention was implemented using the structure depicted in FIGS. 1, 2 and 17. The structure included a Xerox 9700 dry laser printer for producing the facimile image. The computer program used to implement the selection of the PATs from the elementary image arrays, and to select the supercharacters where appropriate is attached as Appendix A to this specification.

Comparison of the Elementary Image Arrays With Stored Arrays

In the comparison stage, every elementary image array is compared with the assemblage of SRA's and the particular SRA with the best match is chosen as the representative character or SRA. The method of doing this depends on the criterion that is chosen to decide on the goodness of a match. A simple, easily implemented criterion that works well in practice is to count the number of bits in both arrays that are in agreement. An array that agrees with another array in every bit position and thus exhibits a count of $N \times N$ is clearly a perfect match. If every bit disagrees, then the two arrays are clearly complements of each other. Thus, both a high count that is close to the maximum $M \times N$, and a low count that is close to the minimum 0, carry considerable information. Therefore, representing an elementary image array by the stored array with the maximal bit agreement is a reasonable choice.

Output Formatter

The formatter 109 consists of a means for data storage comprising the memory of a computer connected to a means for calculating and making logical decisions comprising a cenral processing unit both of well known design. The output of the PAT selector 108 is stored in a defined sequence of data arranged sequentially in the following format.

|  | Description of Data | Number of bytes |
|---|---|---|
| first line | Start of Image indicator | 1 |
|  | Start of Line | 1 |
|  | scan Line Index | 3 |
|  | Character | 1 |
|  | . | |
|  | . | |
|  | . | |
|  | Character | |
|  | End of line indicator | 1 |
| second line | Start of line | |
|  | Scan line index | |
|  | Character | |
|  | . | |
|  | . | |
|  | . | |
|  | Character | |
|  | End of line indicator | |
| last line | Start of line | |
|  | Scan line indicator | |
|  | Character | |
|  | . | |
|  | . | |
|  | . | |
|  | Character | |
|  | End of line indicator | |
|  | End of Image indicator | |

In one realization of the invention, when images are merged with text on one page, it is preferred to use dot address metafunctions in order to skip over white spaces. In another realization it is preferred for this purpose to use white supercharacters instead of metafunctions. The above described data are reformatted for output suitable for the Xerox 9700 (or other printing or display devices). The format, however, depends on whether dot metafunctions or supercharacters are used.

When metafunctions are used, the start of line indicator is replaced by a dot address indicating the number of dots to the first PAT, followed by a scan address indicating the number of scan lines to the first PAT followed by a landscape mode metafunction. The first, and every subsequent, sequence of white characters on the same line is replaced by a dot address that equals the total number of characters occurring to the last PAT in the current sequence of all white PATS multiplied by eight and added to the first dot address. The end of line indicators is replaced by the end of line metafunction followed by the end of line indicator. The second and every subsequent line is formatted in a like fashion.

When dot metafunctions are not used, but instead all white PATs are combined into supercharacters, the total number of all white PATs in every sequence of all white PATs is counted. For each such possible count, the sequence of PATs of the ordinary size is replaced by a shorter sequence (never longer than three PATs) of supercharacters. The supercharacters are chosen according to a table. This table is constructed on the following algorithm.

0. Start.
1. Set $R=0$
2. Is count $\leq 0$. If yes, go to 7. If no, continue.
3. Set R equal to $R+1$.
4. Let $C(R)$ be the longest among 1, 2, , 13, 27, 41, ..., 155 (or, in general, 1, 2, , K, $2K+1$, $3K+2$, ..., $(L+1)K+L$) that is less than or equal to COUNT.
5. Set $COUNT = COUNT - C(R)$.
6. Go to 2.
7. If $R=1$, replace sequence of all white PATs by super PAT with index $C(1)$.
8. If $R=2$ replace sequence of all-white PATs and with sequence of super PATs with indices $C(1)$ and $C(2)$.
9. If $R=3$ replace sequence all white PATs with sequence of super PATs with indices $C(1)$, $C(2)$ and $C(3)$.
10. Stop.

Heuristics of Selecting Patterns

The set of print atoms (PATS), a restricted number of which is also referred to in Knudson as patterns, is selected by combining basic mathematical principles in the art of pattern analysis with the trained judgment of a designer who is at the same time a skilled analyst and computer programmer.

The principles referred to above operate in a mathematical setting that is a model of the actual situation that this invention deals with. A binary image is first decomposed into a set of rectangles (in a certain embodiment $16 \times 16$ arrays). Let the number of rows of each such rectangle be M and the number of columns N. The total number of such rectangles that is possible is $T=2^{MN}$. This is a very large number. For example, if $M=N=16$, then $T=1.16 \times 10^{77}$, which is (according to Eddington) approximately equal to the number of particles in the universe.

On a given $8.5'' \times 11''$ page, only a small fraction of this large number of possible rectangles is represented. Nonetheless, even this small fraction is a sizeable number, 32,871 in the case that $M=N=16$. In a reasonable collection of pages of similar artwork the number of such rectangles is considerable. The statistical universe with which we deal in constructing a set of PATs consists of all the $M \times N$ rectangles that are found in a collection of samples of similar artwork.

Our aim is to subdivide this collection into groups and to choose for each group a representative $M \times N$ array of 0's and 1's. Clearly, there is a very large number of possible ways of making this subdivision and choosing the representatives. For this reason, it is important to have an effective strategy. This strategy is an integral element of our method and will now be disclosed.

We assume that it is possible to determine the degree of dissimilarity between two M×N binary arrays by using one of a number of numerical measures for dissimilarity. For example, the count of unlike bits in corresponding locations is one such measure. The sum of the absolute values of the differences between TOTX, TOTY and TOT (defined above) represents another such measure. Other measures can be devised by taking into account the geometrical nature of the boundary between the region occupied by 0's and the region occupied by 1's in the arrays. We assume that all such measures satisfy the properties, described in the mathematical literature, of a metric. Let us use the symbol D(x,y) to represent the metric; i.e. generalized distance between x and y. D(x,y) must then satisfy the following postulates in order to be a metric. For any triple of the objects in question, x,y,z: $D(x,y) \geq 0$. $D(x,y)=0$ if and only if $x=y$. $D(x,y)=D(y,x)$. $D(x,z) \leq D(x,y)+D(y,z)$.

Suppose, then, that there is some metric D(x,y) which measures the dissimilarity between two M=N binary arrays representing an image element. Let the collection of arrays be divided into K groups and denote the members of the $j^{th}$ group (j=1,2,..., K) by $X_{1j}, X_{2j}, ..., X_{Njj}$, implying thereby that the $j^{th}$ group has Nj members. Let Yj be the M×N pattern that is taken as the representative of the $j^{th}$ group. We can now associate a dissimilarity measure corresponding to the particular partition into groups and the particular assignment of representative arrays to the groups. Let us symbolize the particular partition by G and the particular assignment by y where $$G = G(G_1, G_2, ..., G_k) \text{ and } Y = (Y_1, Y_2, ..., Y_k).$$

The function of G and Y that measures the overall dissimilarity is simply the average E(G,Y) over the collection of all of the separate dissimilarities.

$$E(G,Y) = \frac{1}{C} \sum_{j=1}^{K} \sum_{i=1}^{N_i} D(X_{ij}, Y_j). \quad (1)$$

Let us rewrite the equation (1) by introducing the notation $P_j = N_j/C$ and $$\overline{D_j} = \frac{1}{N_j} \sum_{i=1}^{N_i} D(X_{ij}, Y_j). \quad (2)$$

We then have $$E(G,Y) = \sum_{j=1}^{K} P_j \overline{D_j} \quad (3)$$

We can now prove a number of assertions that will help in choosing an optimal partition G and representative Y.

Assertion 1. If the number of groups in the partition G is increased, it is possible to decrease E. More precisely, for every partition G and representation Y, there exists a partition G' and a representation Y', each with more members such that $$E(G',Y') \leq E(G,Y,)$$

The proof of the assertion lies in the observation that it is simply required to create G' from G by disassociating from one of the groups one element to form an additional group and choosing this same element as the representative of the group. By property 1. of the definition D(X,Y), the resulting added distance is zero. Hence, the assertion is proved. The consequence is that we will always decide on the maximal number K of groups and representatives that we can allow in a given practical situation and proceed to minimize E(G,Y) holding this value of K fixed.

The statement of assertion can be made stronger. Let us rewrite equation (3) in the form $$E(G,Y) = \sum_{j=1}^{K} E(G_j, Y_j) \quad (4)$$

where $$E(G_j, Y_j) = P_j \overline{D_j} \quad (5)$$

It is easy to see that the following statement is true.
Assertion II
If a certain group $G_1$, in the partition G is split into two subgroups $G_1'$ and $G_1''$ then $$\min_Z E(G_1, Z) \geq \min_X E(G_1', X) + \min_Y E(G_1'', Y)$$

and conversely for any two groups say $G_1$ and $G_2$ in the partition G, $$\min_Z E(G_1 \cup G_2, Z) \geq \min_X E(G_1, X) + \min_Y E(G_2, Y)$$

The proof of the assertion follows from the following identifications. Let h(Z)=E(G,Z). Let $f(X)=E(G_1,X)$ and $g(Y)=E(G_2,Y)$.

$$h(Z) = f(Z) + g(Z)$$

Let $Z_0$ be such that $\min_Z h(Z) = h(Z_0)$.

Then $$h(Z_0) = f(Z_0) + g(Z_0).$$

But $f(Z_0) \geq \min_X f(X)$ by definition and $g(Z_0) \geq \min_X f(Y)$ and thus it follows that $\min_Z h(Z) \geq \min_X f(X) + \min_Y g(Y)$ and conversely. Thus the assertion is proved.

Assertions I and II imply the following rule which is the basis for the best selection of patterns.
Rule
Choose K to be the maximum allowable or practicable number of representative patterns. Having fixed K and having chosen a reasonable set of patterns, split and merge groups until the values of $E(G_1,Y_1)$, $E(G_2,Y_2)$, ..., $E(G_K, Y_K)$ are as close to being equal as is possible. The splitting is to be practiced at each stage on the group with the largest E(G,Y) and the merging is to be performed on those groups with the smallest E(G,Y) values. (While merging may increase the value of E, it is required to offset splitting since the total number of groups must be held constant and equal to K.) If all the E(G,Y) values are reasonably equal, the result is close to being optimal and the procedure can stop. If approximate equality cannot be achieved it is necessary to select a different set of first guesses as the initial partition and to start another cycle of splitting and merging.

It should be noted that the correct measure of dissimilarity of elementary image arrays is the one which humans use. It seems reasonable to suppose that this measure satisfies the postulates of a metric, although the third postulate, the triangle inequality, must be experimentally verified. Whether the human measure agrees with one the various measures that are used in various realizations of this invention is not known. However, the Rule enunciated above will produce an optimal set for any specific metric.

In keeping with the above Rule, the procedure for selecting an optimal pattern set is as follows.

Procedure For Selecting a Pattern Set

1. Digitize and store a sufficiently large representative sample of M×N elementary image arrays (EIA).
2. Utilizing a cathode ray tube (CRT) and a computer program, display each EIA in rapid succession to the designer.
3. Make a first selection of stored representative arrays (SRA) by using knowledge of the universe of artwork that is to be represented together with the visual evidence displayed on the CRT.
4. Use the coding program to represent a sample of images with the initial set of SRA's and determine frequency of use of each SRA.
5. Calculate for each SRA the quantity E(G,Y) by finding the average distance for the group and the fraction of the total count and multiplying these two quantities.
6. Split groups with large E(G,Y) values and merge groups with small values.
7. Recalculate the E(G,Y) values and test for equality of $E(G_iY_i)$ values. If reasonably equal, stop. If not, repeat step 6.

Procedures for splitting and merging of groups are known in the art of pattern recognition but only under restrictive a priori assumptions about them. It is generally assumed that the objects that are dealt with can be represented as points in Euclidean space of high dimensions, that the statistics are related to the Gaussian distribution, and that distances are the usual Euclidean distances. The rules and procedures taught in this disclosure are more realistic in that they make no a priori assumption about the structure of the space in which the objects are represented except for the existence of a metric.

I claim:

1. A set of characters comprising a font for use in reproducing an image, said character set comprising
    characters, each character having four connecting sides, each side being substantially perpendicular to two other sides, each character being a composite of two or three regions of at most two colors wherein one of said two colors occupies one region of said character and the other of said two colors occupies at most two regions of said character;
    wherein at least one of said characters of said set is comprised of three said regions of at least two colors and none of said characters of said set is comprised of more than three said regions; and
    wherein each of said regions is bounded by six or fewer straight lines.

2. A set of characters as in claim 1 wherein each of said at most two regions occupied by said other color are located adjacent to selected sides of each of said characters and are separated by the region occupied by said one color.

3. A set of characters as in claim 1 wherein the boundary between any two of said regions of each of said characters is made up of two or fewer straight lines.

4. A set of characters as in claim 3 wherein the boundary between any two of said regions of each of said characters having three regions comprises a single straight line.

5. A set of characters as in claim 4 wherein the boundaries between the region in a selected number of said set of characters having three regions comprise nonintersecting straight lines which are substantially parallel.

6. A set of characters as in claim 4 wherein at least one of said characters having three regions has a boundary between two of said three regions which is substantially perpendicular to at least one side of said at least one character.

7. A set of characters as in claim 1 wherein the boundary between any two of the regions of any of said characters having two regions of different color comprises, in a selected number of said characters, a line consisting of two line segments intersecting at an angle.

8. A set of characters as in claim 7 wherein said two line segments of said boundary intersect nonorthogonally.

9. A set of characters as in claim 1 wherein said two colors are black and white.

* * * * *

UNITED STATES PATENT AND TRADEMARK OFFICE
CERTIFICATE OF CORRECTION

PATENT NO. : 4,529,228
DATED : July 16, 1985
INVENTOR(S) : Henry P. Kramer

It is certified that error appears in the above—identified patent and that said Letters Patent is hereby corrected as shown below:

Col. 4, in Table 3, line 6, "318.096" should read --318,096--;

Col. 9, line 27, "PAT" should read -- PATS --;

Col. 13, line 47, "REVC-" should read --RVEC- --;

Col. 18, line 41, "[(N-2)L+N-]K" should read --[(N-2)L+N-1]K--;

Col. 18, line 50, "$1(F_{L+2} - F_1)2(F_{(2L+3K)} - F_{(L+2)K})$" should read -- $1(F_{L+2} - F_1) + 2(F_{(2L+3K)} - F_{(L+2)K})$ --;

Col. 21, line 26, "cenral" should read -- central--;

Col. 22, line 30, delete "and";

Col. 23, line 25, "M=N" should read --M x N--;

Col. 23, line 66, "G and a" should read -- G' and a --.

Signed and Sealed this

Twenty-fifth Day of March 1986

[SEAL]

Attest:

DONALD J. QUIGG

Attesting Officer

Commissioner of Patents and Trademarks